US010728428B2

(12) United States Patent
Takitsune et al.

(10) Patent No.: US 10,728,428 B2
(45) Date of Patent: *Jul. 28, 2020

(54) SEMICONDUCTOR DEVICE, ELECTRONIC DEVICE MODULE AND NETWORK SYSTEM

(71) Applicant: Renesas Electronics Corporation, Tokyo (JP)

(72) Inventors: Yuichi Takitsune, Tokyo (JP); Kazunori Masaki, Tokyo (JP); Motoshige Ikeda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 16/022,021

(22) Filed: Jun. 28, 2018

(65) Prior Publication Data

US 2018/0309906 A1    Oct. 25, 2018

Related U.S. Application Data

(63) Continuation of application No. 14/928,662, filed on Oct. 30, 2015, now Pat. No. 10,038,827.

(30) Foreign Application Priority Data

Dec. 25, 2014    (JP) ................ 2014-262577

(51) Int. Cl.
H04N 5/067    (2006.01)
H04N 5/12    (2006.01)
H04N 5/04    (2006.01)

(52) U.S. Cl.
CPC ............ H04N 5/067 (2013.01); H04N 5/04 (2013.01); H04N 5/12 (2013.01)

(58) Field of Classification Search
CPC ........ H04J 3/0667; H04J 3/0682; H04N 5/04; H04N 5/067; H04N 5/12
See application file for complete search history.

(56) References Cited

U.S. PATENT DOCUMENTS 4,580,165 A    4/1986    Patton et al.
5,272,532 A    12/1993    Akiba
(Continued)

FOREIGN PATENT DOCUMENTS

CN    102474656 A    5/2012
JP    H 05-130448 A    5/1993
(Continued)

OTHER PUBLICATIONS

United States Notice of Allowance dated Jun. 18, 2018 in U.S. Appl. No. 14/928,662.
(Continued)

Primary Examiner — Edan Orgad
Assistant Examiner — Nourali Mansoury
(74) Attorney, Agent, or Firm — McDermott Will & Emery LLP

(57) ABSTRACT

A semiconductor device including an image sensor device controlled by an adjusting circuit, and the adjusting circuit configured to transmit a control signal to the image sensor device to be controlled according to a transmission cycle synchronized with a reference clock, the image sensor device includes a first period during which the control signal is allowed to be supplied to the image sensor device to be controlled and a second period during which the supplying of the control signal to the image sensor device to be controlled is not preferable compared to that in the first period, the adjusting circuit is configured to, when a transmission timing of the control signal determined according to the transmission cycle is within the second period, adjust the (Continued)

transmission timing of the control signal so that the control signal will be transmitted in the first period to the image sensor device.

20 Claims, 18 Drawing Sheets

(56) References Cited

U.S. PATENT DOCUMENTS

| | | | |
|---|---|---|---|
| 5,608,462 | A | 3/1997 | Maas et al. |
| 7,576,771 | B1 | 8/2009 | Kotlowski et al. |
| 8,982,219 | B2 | 3/2015 | Tsubaki et al. |
| 9,226,766 | B2 | 1/2016 | Aldridge et al. |
| 2005/0097420 | A1 | 5/2005 | Frisch et al. |
| 2006/0256207 | A1* | 11/2006 | Kokubo .......... H04N 5/2351 348/223.1 |
| 2006/0256821 | A1 | 11/2006 | Richards |
| 2008/0309392 | A1 | 12/2008 | Warren |
| 2011/0231566 | A1 | 9/2011 | Gelter et al. |
| 2012/0086814 | A1 | 4/2012 | Tsubaki et al. |
| 2013/0113653 | A1 | 5/2013 | Kishigami et al. |
| 2013/0287122 | A1 | 10/2013 | Mizosoe et al. |

FOREIGN PATENT DOCUMENTS

| | | |
|---|---|---|
| JP | H 09-501816 A | 2/1997 |
| JP | 2005-286453 A | 10/2005 |
| JP | 2011-234341 A | 11/2011 |
| JP | 2014-175870 A | 9/2014 |

OTHER PUBLICATIONS

United States Office Action dated Sep. 7, 2017 in U.S. Appl. No. 14/928,662.

Japanese Office Action dated May 8, 2018 in corresponding Japanese Application No. 2014-262577 with an English translation thereof.

* cited by examiner

SEMICONDUCTOR DEVICE, ELECTRONIC DEVICE MODULE AND NETWORK SYSTEM

CROSS-REFERENCE TO RELATED APPLICATIONS

The present application is a Continuation Application of U.S. patent application Ser. No. 14/928,662, filed on Oct. 30, 2015, which is based on Japanese patent application No. 2014-262577, filed on Dec. 25, 2014, the disclosure of which is incorporated herein in its entirety by reference.

BACKGROUND

The present disclosure relates to a semiconductor device, and can be suitably used, for example, for a semiconductor device that generates a signal to control a device used in a time-synchronized distributed system.

In a distributed system including a plurality of elements (nodes) connected to a network, each of the plurality of nodes operates based on its local clock. In some implementations, in order to accomplish synchronization of events occurring in the plurality of nodes, for example, the distributed system may need to time-synchronize the plurality of nodes (i.e., their local clocks). The time synchronization of the distributed system is accomplished by frequently exchanging messages (information) among the plurality of nodes in the distributed system. Typically, any one of the nodes in the distributed system that is predetermined or dynamically selected serves as a master clock node. The local clock of the master clock node is called a master clock. The master clock node exchanges messages (information) with other nodes (slave clock nodes) in the distributed system and thus each slave clock node synchronizes its local clock (i.e., slave clock) with the master clock.

Precision Time Protocol (PTP), which is defined in IEEE Standard 1588, is one of the representative examples of a time synchronization method of the distributed system. Further, generalized PTP (gPTP) defined in IEEE Standard 802.1AS, which is one of the standards that constitute Ethernet Audio/Video Bridging (AVB), is known as a time synchronization method using the PTP. The gPTP defines a time synchronization method in IEEE 802.3 network (i.e., Wired LAN) and IEEE 802.11 network (i.e., Wireless LAN). In the PTP, the master clock node is called a ground master clock and the slave clock node is called a clock slave. In order to accurately synchronize with the ground master clock, the clock slave exchanges messages (i.e., Sync, Follow Up, Delay Request, and Delay Response) with the ground master clock, calculates network delay time based on the transmission time and the reception time of these messages, and adjusts its local clock using the calculated network delay time.

The distributed system that requires the time synchronization is, for example, a manufacturing system including an industrial robot and a metrology device therefor, a surveillance system including networked surveillance cameras, and an automotive camera system. The automotive camera system includes a surround view camera system, a bird view camera system, and a side view camera system. This automotive camera system uses a plurality of cameras and processes images taken by the plurality of cameras to assist parking, detect obstacles and the like.

Japanese Patent Application Publication No. 2005-286453 discloses a technique for synchronizing in time a plurality of cameras, each connected to a network, using a synchronization procedure similar to the PTP.

SUMMARY

As described above, a slave clock node in a distributed system exchanges messages with a master clock node via a network to synchronize its local clock (i.e., the slave clock) with the master clock. However, the frequency of a local clock oscillator (e.g., a crystal oscillator) within the slave clock node is naturally different from the frequency of a local clock oscillator (i.e., the master clock) within the master clock node due to initial manufacturing tolerances, changes in temperature and pressure, and aging degradation. Further, the network delay time varies due to forwarding delay jitter in networking devices (e.g., hubs and switches (bridges) in the IEEE 802.3 network) that connects nodes. In order to compensate for a decrease in the synchronization accuracy due to these unstable factors, the slave clock node continuously exchanges messages with the master clock node and corrects a local clock offset according to the results of the exchange of the messages.

When there is a time difference between the slave clock time and the master clock time, the offset (positive or negative value) is added to the slave clock time to cancel the time difference. The slave clock time may greatly vary due to the processing for adjusting the slave clock. That is, the slave clock time jumps backward when the slave clock time advances the master clock time and otherwise the slave clock time jumps forward.

Such a change in the slave clock time may cause a problem when the slave node controls a device using the slave clock. In particular, when the device to be controlled has timing constraints, the change in the slave clock time may have an influence on the operation of the device to be controlled. Assume a case, for example, in which the slave clock node generates a periodic synchronization signal (e.g., pulse signal) to be supplied to the device to be controlled according to the slave clock (local clock) time-synchronized with the master clock. When the slave clock time changes discontinuously, the phase of (the transmission cycle of) the synchronization signal changes discontinuously according to the change in the slave clock time, and the change in the phase of (the transmission cycle of) the synchronization signal may have an influence on the operation of the device to be controlled.

One example of the device to be controlled having the timing constraints is an image sensor device equipped with a Complementary Metal Oxide Semiconductor (CMOS)/Charge Coupled Device (CCD) image sensor. In one implementation, the image sensor device expects the reception of the synchronization signal of one frame period (e.g., $\frac{1}{30}$ seconds) or one field period (e.g., $\frac{1}{60}$ seconds) in order to control a shutter timing of the image sensor, an output of a pixel signal by the image sensor and image signal processing by an image signal processor (ISP). In this case, change in the phase of (the transmission cycle of) the synchronization signal may cause degradation or lack of the pixel signal and an image generated based on the pixel signal. In the case of an automotive camera system including a plurality of image sensor devices, if an image taken by one of the image sensor devices is degraded, the system may lack information on an obstacle that should be detected.

In the following description, a plurality of embodiments which can contribute to solution of at least one of problems including the aforementioned problem will be described. It should be noted that the aforementioned problem is merely one of problems that will be solved by the embodiments disclosed in this specification. Other problems and novel features will be apparent from the description of the specification and the accompanying drawings.

In one embodiment, a semiconductor device includes an adjusting circuit that transmits a control signal to a device to be controlled according to a transmission cycle synchronized with a reference clock. The device to be controlled has a first period during which the control signal is allowed to be supplied to the device to be controlled and a second period during which the supplying of the control signal to the device to be controlled is not preferable compared to that in the first period. The adjusting circuit is configured to, when a transmission timing of the control signal determined according to the transmission cycle is within the second period, adjust the transmission timing of the control signal so that the control signal will be transmitted in the first period.

In another embodiment, a semiconductor device is configured to generate a control signal to be supplied to a device to be controlled according to a transmission cycle synchronized with a reference clock. The semiconductor device further operates as follows when the timing for transmitting the control signal according to the transmission cycle no longer meets timing constraints of the device to be controlled due to a change in a phase of the transmission cycle. That is, the semiconductor device is configured to suppress transmission of the control signal that does not meet the timing constraints and transmit the control signal using a permissible range of the transmission timing within the timing constraints.

The above embodiments contribute to the solution of the aforementioned problem.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Specific embodiments will be described in detail with reference to the drawings. The same or corresponding elements are denoted by the same reference symbols throughout the drawings and repeated descriptions will be omitted as appropriate for the sake of clarification of the description.

First Embodiment

Figure 1:
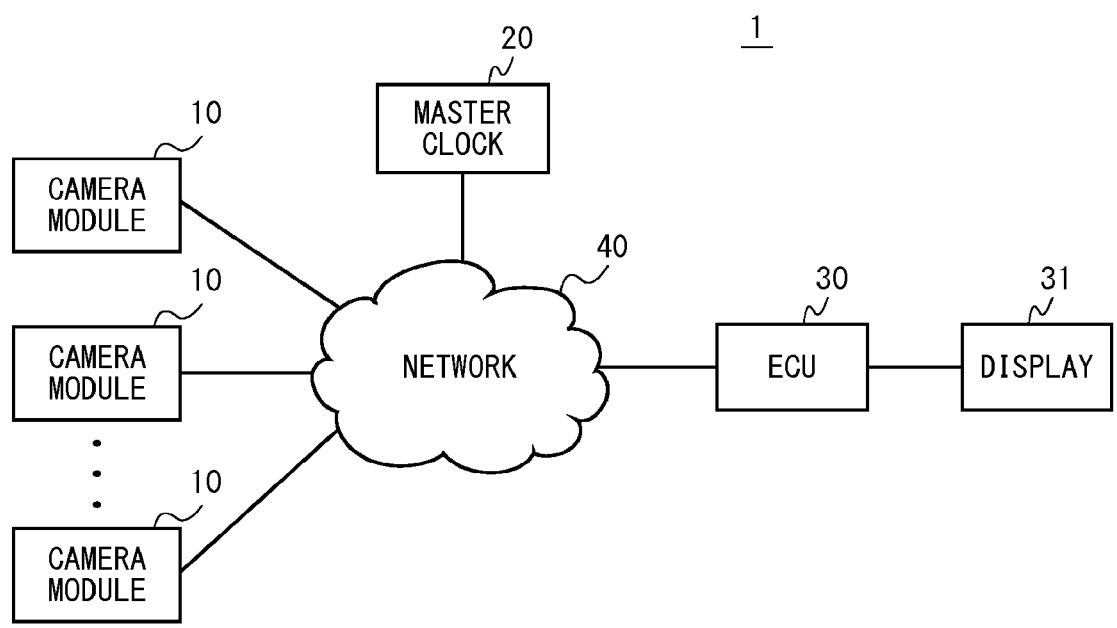
FIG. 1 is a diagram showing a configuration example of a network system (distributed system) according to some embodiments.

FIG. 1 shows a configuration example of a network system (distributed system) 1 according to this embodiment. The network system 1 includes a plurality of nodes connected to a network 40. These nodes perform time synchronization using distributed clock synchronization (e.g., PTP or gPTP). In some implementations, the network system 1 may be an automotive camera system. In the example shown in FIG. 1, a plurality of camera modules 10, a master clock 20, and an Electronic Control Unit (ECU) 30 are connected to the network 40. The master clock 20 operates as a master clock node for distributed clock synchronization and each camera module 10 operates as a slave clock node. Each camera module 10 exchanges messages (information, signals and the like) with the master clock 20 to synchronize its local clock (slave clock) with a local clock of the master clock 20. The master clock 20 may have a radio-controlled clock that receives standard time radio waves to synchronize the local clock of the master clock 20 with accurate reference time (real time) or may have a radio receiver to synchronize the local clock of the master clock 20 with a Global Positioning System (GPS) satellite or a mobile telephone base station.

Local clocks included in the plurality of camera modules 10 synchronize in time with the common master clock 20, the plurality of camera modules 10 can capture images according to the common clock. The ECU 30 communicates with the camera modules 10 via the network 40, controls the camera modules 10 to capture images, and receives the captured images obtained by the camera modules 10. In some implementations, in order to assist parking, the ECU 30 may process images taken by the camera modules 10 substantially at the same time, generate a surround view image or a bird view image, and then display it on a display 31. Further, in some implementations, the ECU 30 may use images taken by the camera modules 10 substantially at the same time to detect an obstacle. The ECU 30 is a computer system including at least one processor (e.g., microprocessor or microcontroller) and, in one implementation, may include one or more Integrated Circuit (IC) chips.

The network 40 may include an IEEE 802.3 network (i.e., Wired LAN), an IEEE 802.11 network (i.e., Wireless LAN), or a combination thereof. In these cases, the network 40 may include at least one switch (or hub) that relays Media Access Control (MAC) frames transmitted or received by a plurality of nodes including the camera modules 10, the master clock 20, and the ECU 30.

Note that the configuration example shown in FIG. 1 is merely one example and may be changed as appropriate. For example, the ECU 30 may also communicate with the master clock 20 and synchronize a local clock of the ECU 30 with the local clock of the master clock 20. Alternatively, the master clock 20 may be integrally formed with the ECU 30 or, in other words, the hardware and function of the master clock 20 may be included in the ECU 30. In one more alternative, the hardware and function of the master clock 20 may be included in at least one of the camera modules 10.

Figure 2:
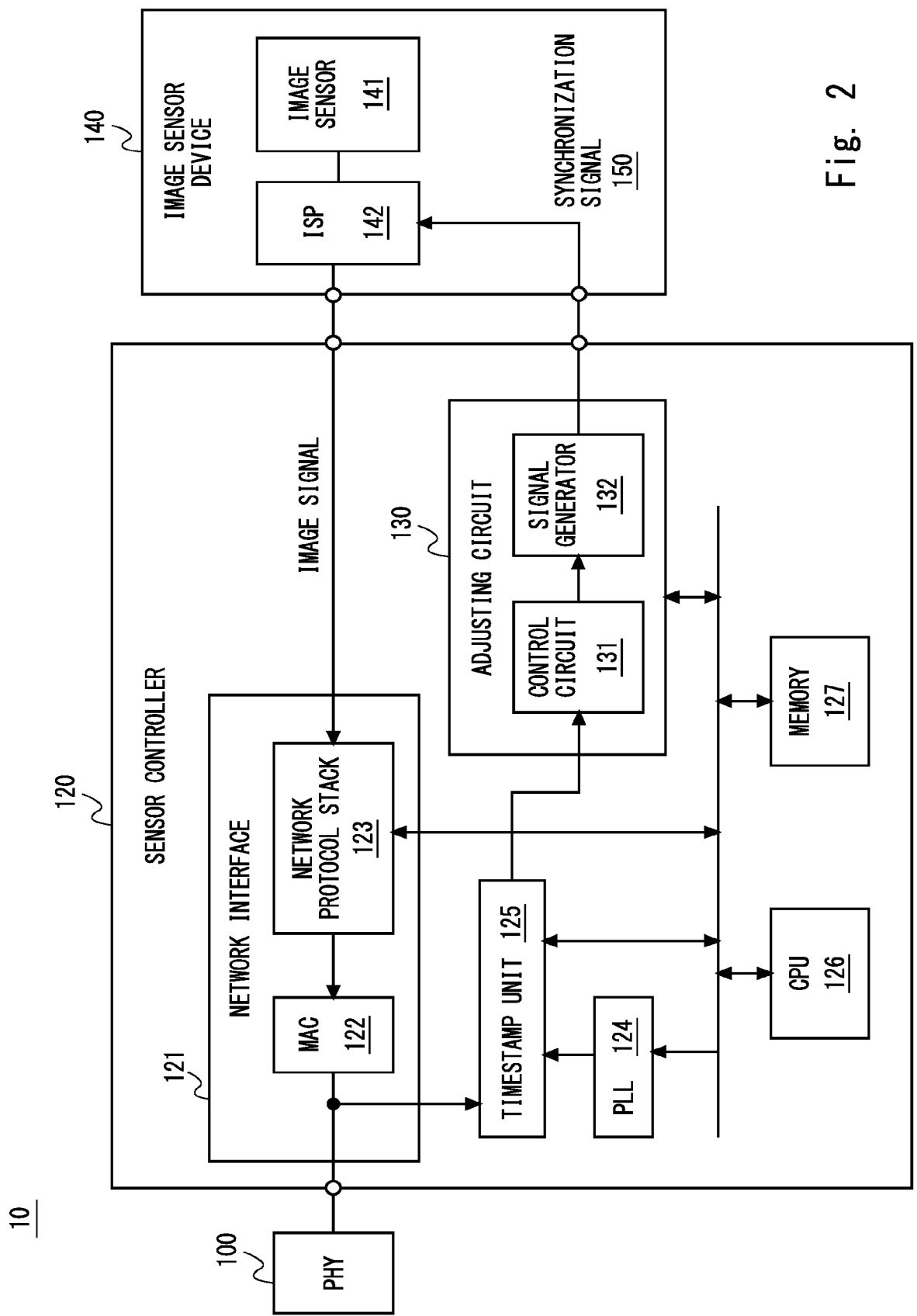
FIG. 2 is a Block diagram showing a configuration example of a camera module according to some embodiments.

In the following description, the configuration and the operation of each camera module 10 will be described in detail. FIG. 2 is a Block diagram showing a configuration example of the camera module 10. In the example shown in FIG. 2, the camera module 10 includes a PHY circuit 100, a sensor controller 120, and an image sensor device 140. For example, although not shown in FIG. 2, the sensor controller 120 and the image sensor device 140 are mounted on a mounted substrate (e.g., wiring board, interposer substrate, and motherboard) and are electrically connected to each other via wirings formed on the mounted substrate. The PHY circuit 100 performs signal processing conforming to a physical layer (PHY layer) of the network 40 and transmits and receives physical layer signals to and from the network 40.

The image sensor device 140 includes an image sensor 141 (e.g., CMOS image sensor or CCD image sensor) and an Image Signal Processor (ISP) 142. The ISP 142 controls image capturing by the image sensor 141, receives a pixel signal generated by the image sensor 141, performs digital signal processing including color correction and white balance correction on the pixel signal, and thereby generates an image signal.

The sensor controller 120 is connected to the PHY circuit 100 and is configured to communicate with other network nodes including the master clock 20 and the ECU 30 via the network 40. In order to perform this communication, in the configuration example shown in FIG. 2, the sensor controller 120 includes a network interface 121. The network interface 121 includes a MAC unit 122 and a network protocol stack 123. The MAC unit 122 provides, to the network protocol stack 123, MAC layer (data link layer) services (i.e., signal processing and control) including media access control, error check, and assembly and disassembly of the MAC frames. The network protocol stack 123 provides services in layers (e.g., network layer and transport layer) higher than the MAC layer. In some implementations, the network protocol stack 123 may support the Internet Protocol (IP), the Transmission Control Protocol (TCP), and the User Datagram Protocol (UDP).

The sensor controller 120 is further configured to support the distributed clock synchronization and generate the local clock (slave clock) time-synchronized with the master clock 20. In order to perform the distributed clock synchronization, in the configuration example shown in FIG. 2, the sensor controller 120 includes a Phase Locked Loop (PLL) 124, a timestamp unit (TSU) 125, a Central Processing Unit (CPU) 126, and a memory 127. The CPU 126 controls the PLL 124 to generate a local clock synchronized with the phase and frequency of the master clock 20. The TSU 125 receives the local clock generated by the PLL 124 and generates local timestamps time-synchronized with the absolute time (real time) of the master clock 20. The CPU 126 controls the TSU 125 to perform an offset correction for aligning its timestamps with timestamps generated by the master clock 20.

The CPU 126 loads and executes software (programs) for the distributed clock synchronization (e.g., a PTP or gPTP program module) stored in the memory 127 and thereby controls the PLL 124 and the TSU 125. In some implementations, the CPU 126 exchanges messages with the master clock 20 via the network interface 121, calculates a network delay and the time difference between the local clock time and the absolute time of the master clock 20, and controls the PLL 124 and the TSU 125 to correct the time difference. The memory 127 includes a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), a Programmable ROM (PROM), a flash memory, or any combination thereof.

Further, the sensor controller 120 is configured to control the image capturing by the image sensor device 140 according to the local clock time (local timestamps generated by the TSU 125) time-synchronized with the master clock 20. Specifically, the sensor controller 120 supplies a synchronization signal 150 to the image sensor device 140 periodically with a transmission cycle according to the local clock time, which is time-synchronized with the master clock 20. In order to achieve this purpose, the sensor controller 120 includes an adjusting circuit 130. The adjusting circuit 130 includes a control circuit 131 and a signal generator 132. The control circuit 131 determines the transmission cycle of the synchronization signal 150 based on the local timestamp supplied from the TSU 125. The signal generator 132 generates the synchronization signal 150 according to the timing indicated by the control circuit 131 and supplies the synchronization signal 150 to the image sensor device 140. The image sensor device 140 controls a shutter timing of the image sensor 141, output of the pixel signal by the image sensor 141 and the image signal processing by the ISP 142 according to the periodic synchronization signal 150. Although the transmission cycle (period) of the synchronization signal 150 depends on the image sensor device 140, one frame period (e.g., 1/30 seconds) or one field period (e.g., 1/60 seconds) is typically employed as the transmission cycle (period) of the synchronization signal 150.

Further, the sensor controller 120 is configured to receive the image signal that has been generated by the image sensor device 140 and transmit the received image signal to the ECU 30 via the network 40. The network interface 121 receives the image signal from the image sensor device 140 and transmits the received image signal to the ECU 30 via the network 40.

As already described above, in order to keep the time synchronization of the slave clock included in the sensor controller 120, it is required to compensate for a degradation in the synchronization accuracy due to various uncertain factors (e.g., manufacturing tolerance of a local clock oscillator (crystal oscillator), frequency drift due to temperature, aging degradation, and delay jitter in a network). Therefore, the sensor controller 120 (CPU 126) continuously exchanges messages with the master clock 20 and corrects the slave clock time (the PLL 124 and the TSU 125). Specifically, when there is a time difference between the slave clock time and the master clock time, the sensor controller 120 adds the offset (positive or negative value) to the slave clock time to cancel the time difference.

However, as already described above, the slave clock time may greatly vary due to the processing for adjusting the slave clock. Such a change in the slave clock time may cause a problem when the sensor controller 120 controls the image sensor device 140 using the slave clock time. Specifically, the phase of (the transmission cycle of) the synchronization signal 150 also changes discontinuously according to the change in the slave clock time, and the change in the phase may have an influence on the operation of the image sensor device 140. This is because, since the image sensor device 140 expects to periodically receive the synchronization signal 150 (e.g., one frame period (e.g., 1/30 seconds) or one field period (e.g., 1/60 seconds)) and controls the image sensor 141 and the ISP 142 according to the periodic synchronization signal 150, the change in the phase of (the transmission cycle of) the synchronization signal 150 may cause degradation or lack of the pixel signal and the image signal generated based on the pixel signal. In the following description, the influence of the phase change in the synchronization signal 150 on the operation of the image sensor device 140 will be described, and the operation of the adjusting circuit 130 to reduce this influence will also be described.

Figure 3:
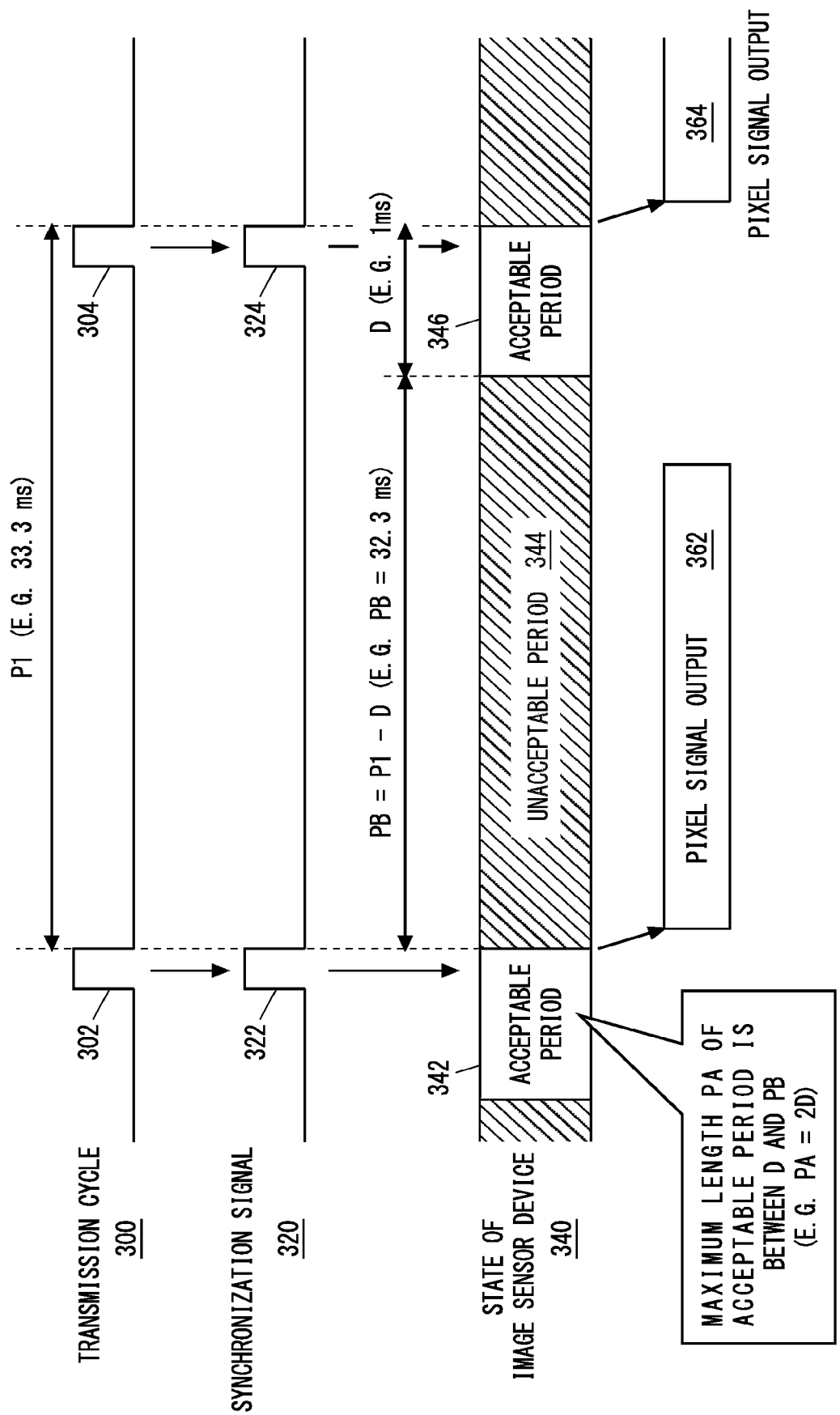
FIG. 3 is a diagram for describing one example of timing constraints of an image sensor device.

FIG. 3 is a diagram showing one example of timing constraints imposed on the image sensor device 140. A transmission cycle 300 shown in FIG. 3 shows one example of the transmission cycle of the synchronization signal 150 and a synchronization signal waveform 320 shows one example of the periodic synchronization signal 150. In the example shown in FIG. 3, a period P1 of the transmission cycle 300 is one frame period (1/30 seconds, i.e., about 33.3 milliseconds) and pulses 302 and 304 indicate transmission timings of the synchronization signal. The synchronization signal waveform 320 according to the transmission cycle 300 is a pulse wave having a period of 1/30 seconds (about 33.3 milliseconds) and includes pulses 322 and 324.

A state 340 of the image sensor device 140 shown in FIG. 3 indicates the timing constraints of the image sensor device 140. That is, the state 340 includes an acceptable period (342, 346) and an unacceptable period (344) that are alternately repeated. The acceptable period (342, 346) means a period during which the image sensor device 140 can accept the synchronization signal 150 (i.e., synchronization signal pulses 322 and 324 shown in FIG. 3) or, in other words, the image sensor device 140 expects to receive the synchronization signal 150. It can also be said that the acceptable period (342, 346) is a preferred period for the image sensor device 140 to normally operate or is a period during which the image generated by the image sensor device 140 is not degraded. As shown in FIG. 3 (362, 364), the image sensor device 140 reads out (or outputs) the pixel signal from the image sensor 141 upon receiving the synchronization signal 150 (i.e., synchronization signal pulses 322, 324).

On the other hand, the unacceptable period (344) means a period during which it is not preferable to receive the synchronization signal 150 (i.e., synchronization signal pulses 322 and 324 in FIG. 3) in the image sensor device 140. It can be said that the unacceptable period (344) is a period during which it is inappropriate to receive the synchronization signal 150, a period during which the normal operation of the image sensor device 140 is not guaranteed, or a period during which the image generated by the image sensor device 140 is degraded. Although the image sensor device 140 is able to receive the synchronization signal 150 in the unacceptable period (344), the pixel signal and the image generated based on the pixel signal may be degraded or lost. In some implementations, the acceptable period (342, 346) corresponds to a vertical blanking period in which the pixel signal is read out (or output) from each pixel of the image sensor 141 and the unacceptable period (344) corresponds to an exposure period (accumulation period) in which charge accumulation is performed in each pixel of the image sensor 141. In this case, it can be said that the synchronization signal 150 specifies a "readout pulse" that indicates timing for reading out the pixel signal.

The timing constraints of the image sensor device 140 include a maximum length (PA) of the acceptable periods (342, 346) and a predetermined length (PB) of the unacceptable period (344). As shown in FIG. 3, the unacceptable period (344) is a fixed period having a predetermined length PB (e.g., about 32.3 milliseconds) shorter than the transmission cycle of the synchronization signal 150 (e.g., one frame period, that is about 33.3 milliseconds). Now, a difference D (e.g., 1 millisecond) between the transmission cycle length of the synchronization signal 150 and the predetermined length of the unacceptable period (344) will be defined. Meanwhile, the acceptable period (342, 346) is a non-fixed period that begins after the unacceptable period (344) and ends upon receiving the synchronization signal 150 (pulses 322 and 324). The maximum length PA of the acceptable period (342, 346) is equal to or longer than the difference D (e.g., 1 millisecond) but equal to or shorter than the length PB of the unacceptable period (344). In one example, the maximum length PA of the acceptable period may be twice as long as the difference D (e.g., 2 milliseconds).

Figure 4:
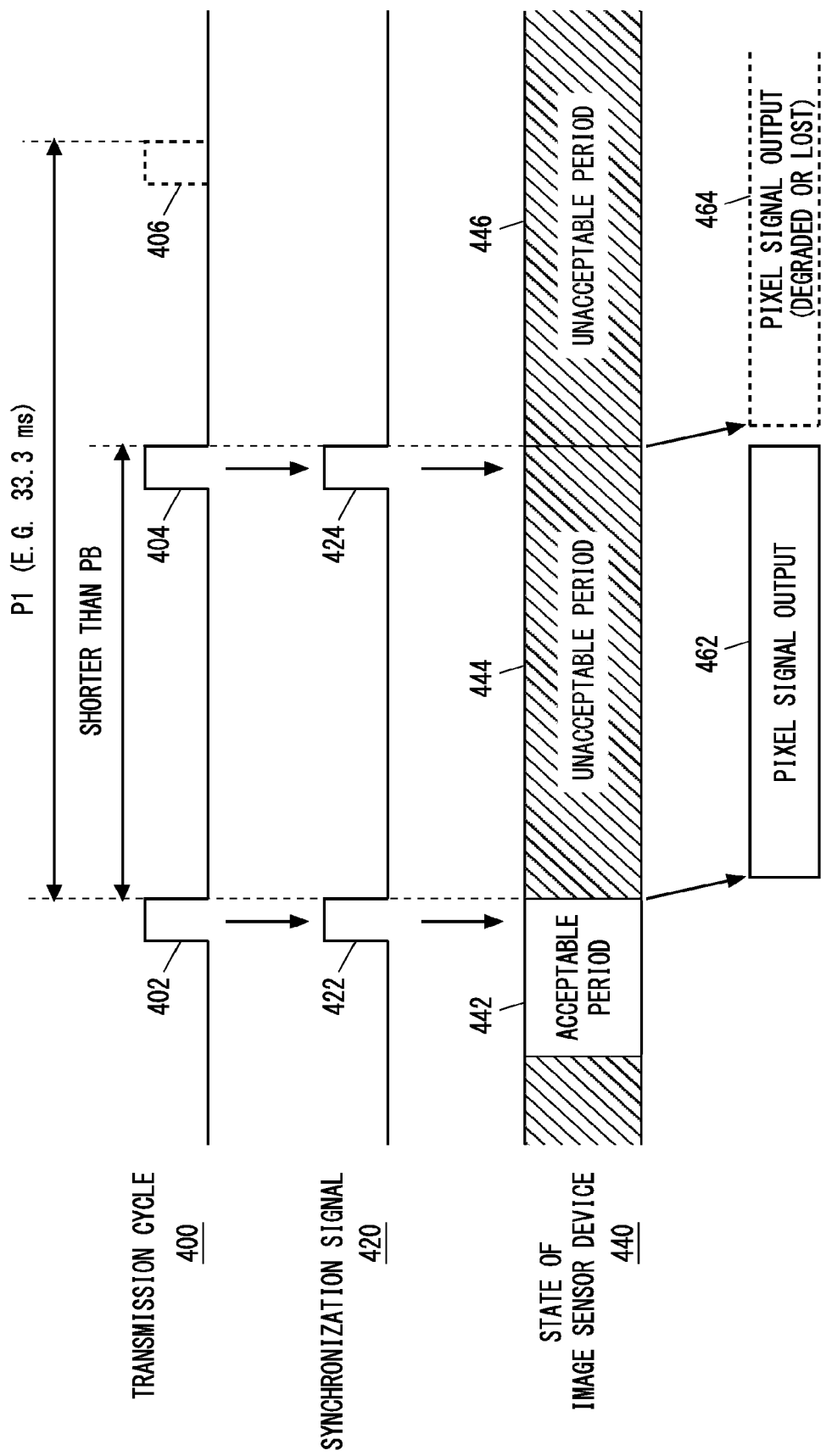
FIG. 4 is a diagram for describing one example of timing constraints of the image sensor device.

FIG. 4 shows an operation example of the image sensor device 140 when the above timing constraints are violated. In the example shown in FIG. 4, the phase of the transmission cycle 400 changes due to any factor such as adjustment of the slave clock time. Specifically, the phase of the transmission cycle 400 changes after a pulse 402 and thus the interval between the pulse 402 and a pulse 404 becomes shorter than the length (PB) of the unacceptable period. Note that a pulse 406 shown by a dashed line shows a normal transmission timing which would arrive next to the pulse 402 according to the normal period P1 of the transmission cycle if the change in the phase of the transmission cycle did not occur.

A synchronization signal waveform 420 shown in FIG. 4 shows transmission timings of the synchronization signal 150 when it is assumed that the timing adjustment of the synchronization signal 150 by the sensor controller 120 (adjusting circuit 130) is not performed. That is, a synchronization signal pulse 422 is generated according to the transmission timing 402 before the phase change and a synchronization signal pulse 424 is generated according to the transmission timing 404 after the phase change. When the synchronization signal pulse 424 is transmitted, the image sensor device 140 is still in the unacceptable period (444). In one implementation, the image sensor device 140 interrupts the unacceptable period (444) and starts a new unacceptable period 446, interrupts the readout (or output) of a pixel signal 462, and attempts to output a new pixel signal according to the transmission cycle after the phase change. However, since the amount of electric charges accumulated in the pixels of the image sensor 141 is not sufficiently large, a pixel signal output 464 may degrade or lost.

Figure 5:
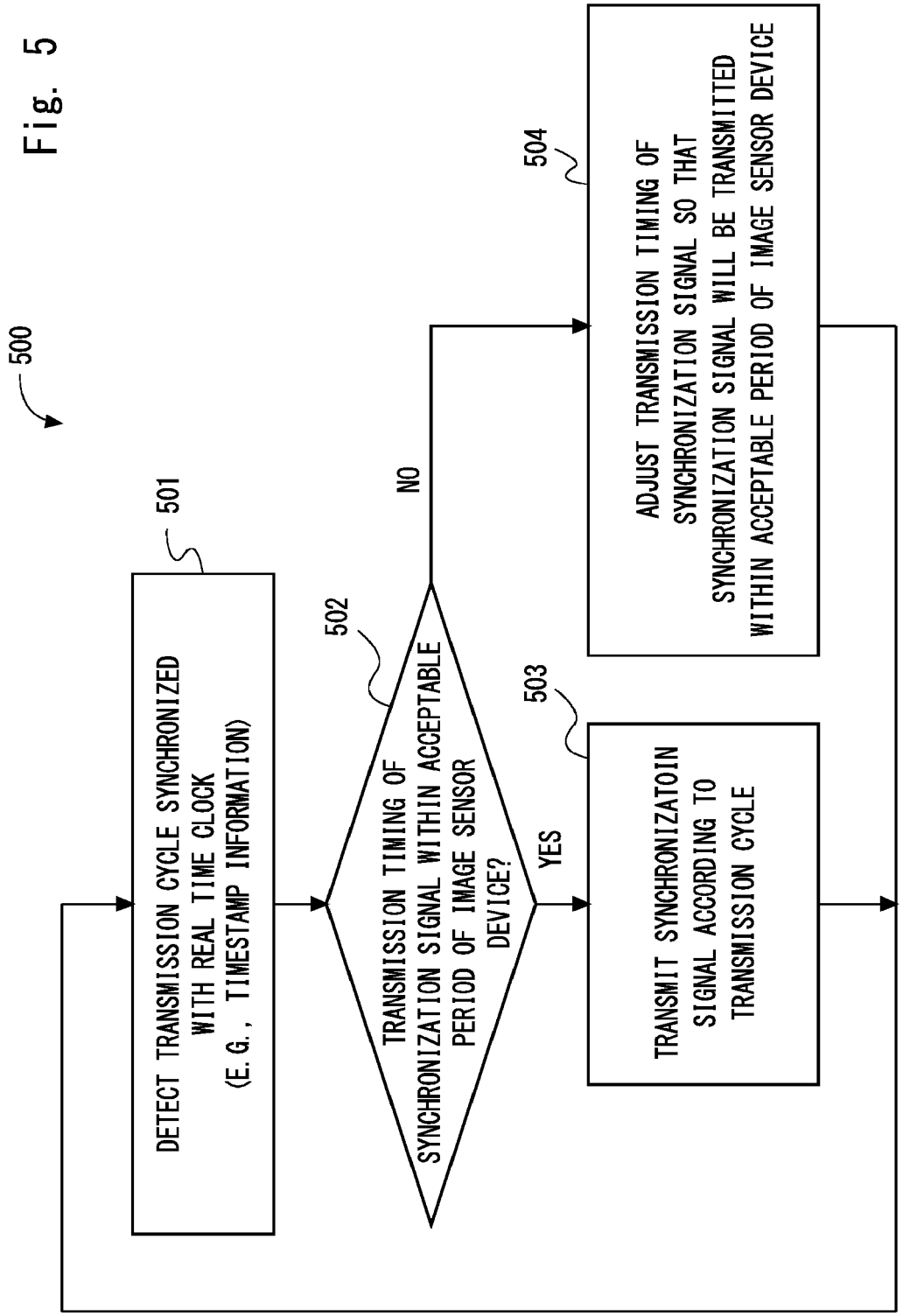
FIG. 5 is a flowchart showing one example of processing performed by an adjusting circuit according to a first embodiment.

In order to prevent the problem described with reference to FIG. 4, the sensor controller 120 (adjusting circuit 130) according to this embodiment operates as follows. FIG. 5 is a flowchart showing processing 500 that is one example of the processing performed by the adjusting circuit 130. In Block 501, according to the real time clock (e.g., local timestamp information supplied from the TSU 125), the control circuit 131 in the adjusting circuit 130 detects the transmission timing of the synchronization signal 150 synchronized with the real time clock. As already described above, the transmission cycle of the synchronization signal 150 is normally constant. However, when the slave clock (local clock) is corrected to time-synchronize with the master clock 20, the phase of the transmission cycle of the synchronization signal 150 may be changed.

In Block 502, the control circuit 131 determines whether the transmission timing of the synchronization signal 150 is within the acceptable period of the image sensor device 140. The determination in Block 502 may be performed by determining whether the time elapsed since the last transmission timing (transmission time of the synchronization signal 150) is equal to or longer than the length PB of the unacceptable period of the image sensor device 140.

When the detected transmission timing is within the acceptable period of the image sensor device 140 (YES in Block 502), the control circuit 131 triggers the signal generator 132 to generate the synchronization signal 150 according to the detected transmission cycle. Accordingly, the signal generator 132 transmits the synchronization signal 150 according to the detected transmission cycle (Block 503).

On the other hand, when the detected transmission timing is outside the acceptable period of the image sensor device 140 (NO in Block 502), the control circuit 131 adjusts the transmission timing of the synchronization signal 150 so that the synchronization signal 150 will be transmitted within the acceptable period of the image sensor device 140. As one example, the control circuit may operate as follows. The control circuit 131 suppresses transmission of the synchronization signal 150 outside the acceptable period. Further, the control circuit 131 triggers the signal generator 132 to transmit the synchronization signal 150 in a vicinity of the beginning of the acceptable period or in a vicinity of the end of the acceptable period based on the maximum length PA. Accordingly, the signal generator 132 transmits the synchronization signal 150 in the vicinity of the beginning of the acceptable period or in the vicinity of the end of the acceptable period regardless of the detected transmission cycle (Block 504).

When the phase of the transmission cycle has been greatly changed, the adjusting circuit 130 can make the phase of the acceptable period of the image sensor device 140 approach the phase of the transmission cycle of the synchronization signal 150 step by step by repeating the processing shown in FIG. 5, especially the processing of Block 504. In other words, the adjusting circuit 130 repeatedly transmits the synchronization signal 150 in the acceptable period of the image sensor device 140, thereby making the transmission timing of the synchronization signal 150 gradually approach the transmission timing according to the real time clock (transmission cycle) after the correction. Consequently, the image sensor device 140 can follow the transmission cycle of the synchronization signal 150 after the phase change.

Figure 6:
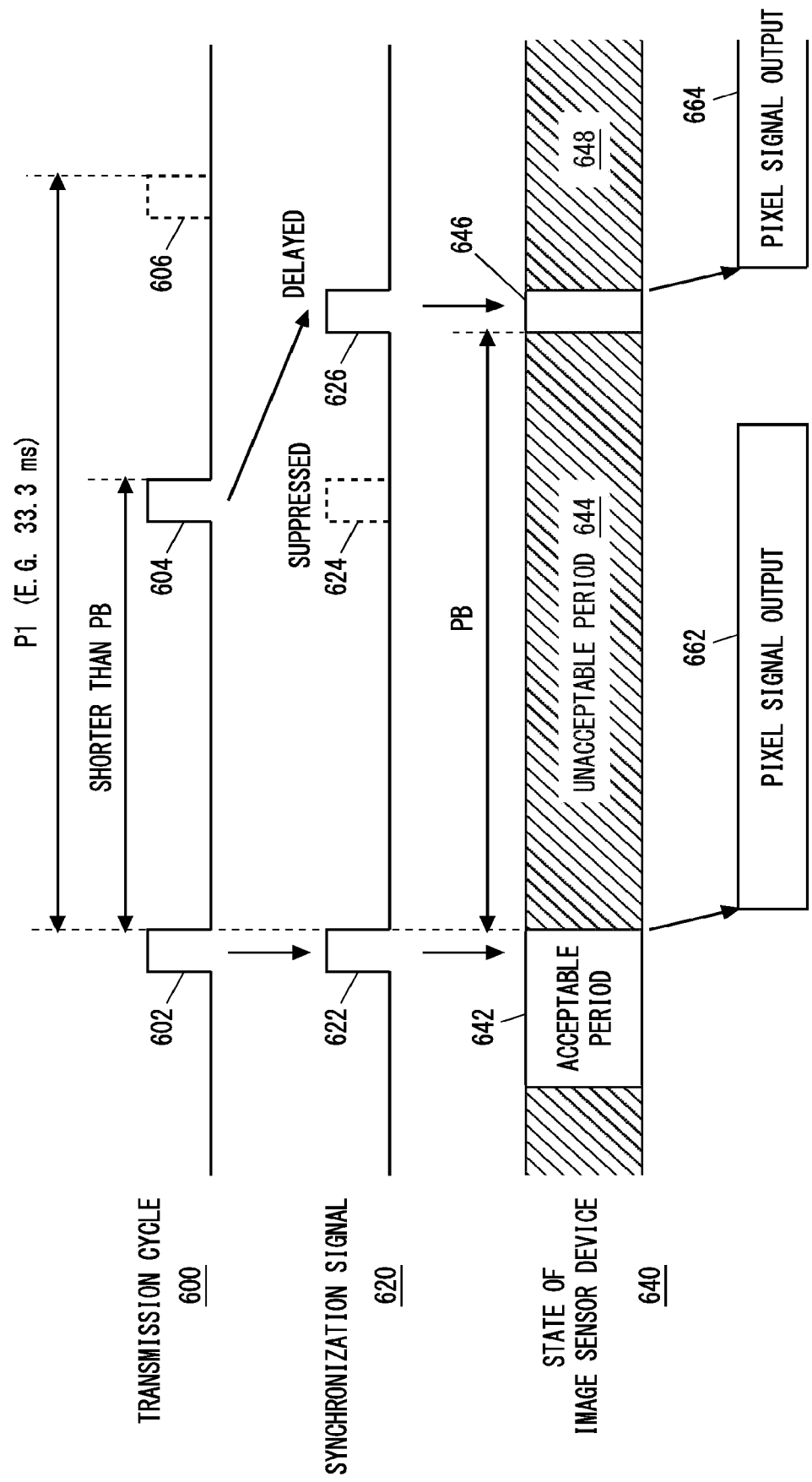
FIG. 6 is a diagram for describing a relation between a synchronization signal generated by the adjusting circuit and timing constraints of the image sensor device according to the first embodiment.

In the following description, with reference to FIGS. 6 and 7, specific examples of the operations of the adjusting circuit 130 when the transmission cycle phase of the synchronization signal 150 has been changed will be described. FIG. 6 shows a case in which the transmission cycle phase of the synchronization signal 150 has been advanced. The case shown in FIG. 6 occurs when, for example, the slave clock time jumps forward by a correction since the slave clock time lags behind the master clock time. In the example shown in FIG. 6, the phase of a transmission cycle 600 changes after a pulse 602 and thus the interval between the pulse 602 and a pulse 604 is shorter than the length (PB) of the unacceptable period. A pulse 606 which is shown by a dashed line indicates a normal transmission timing which would arrive next to the pulse 602 according to the normal period P1 of the transmission cycle if the change in the phase of the transmission cycle did not occur.

A synchronization signal waveform 620 shown in FIG. 6 shows how the timing adjustment of the synchronization signal 150 is performed by the adjusting circuit 130. That is, the adjusting circuit 130 generates a synchronization signal pulse 622 according to the transmission timing 602 before the phase change. The position of the synchronization signal pulse 622 corresponds to an acceptable period 642 in a state 640 of the image sensor device 140. The image sensor device 140 starts an output of the pixel signal (662) in response to the reception of the synchronization signal pulse 622 and makes a transition to an unacceptable period 644 in which the charge accumulation in the image sensor 141 is executed.

Next, the adjusting circuit 130 suppresses transmission of a synchronization signal pulse 624 according to the transmission timing 604 after the phase change. This is because the transmission timing 604 and the synchronization signal pulse 624 based on the transmission timing 604 are within the unacceptable period (644) in the state 640 of the image sensor device 140. The adjusting circuit 130 promptly transmits a synchronization signal pulse 626 in a vicinity of the beginning of an acceptable period 646 that follows the unacceptable period 644. The image sensor device 140 starts an output of the pixel signal (664) in response to the reception of the synchronization signal pulse 626 and makes a transition to an unacceptable period 648 in which the charge accumulation in the image sensor 141 is executed.

It should be noted with respect to FIG. 6 that the transmission timing of the synchronization signal pulse 626 goes ahead of the pulse 606 shown by the dashed line, which is the normal transmission timing which would arrive next to the pulse 602 according to the normal period P1 of the transmission cycle if the change in the phase of the transmission cycle did not occur. Therefore, by repeating the operation shown in FIG. 6 by step by step, the phase of the acceptable period after the acceptable period 646 gradually advances and, consequently, the phase of the acceptable period can be adjusted to the phase of the transmission cycle after the phase change.

Figure 7:
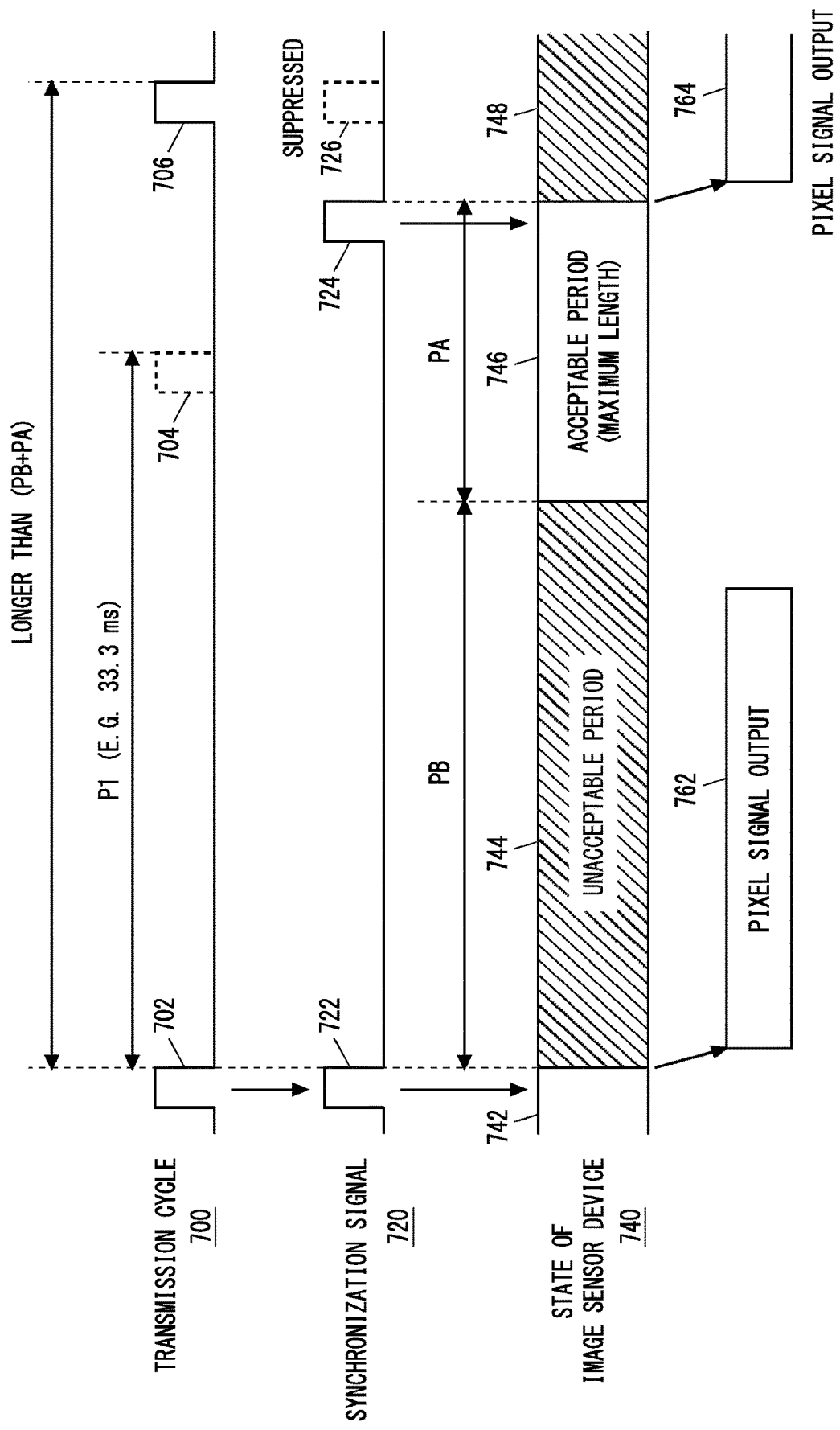
FIG. 7 is a diagram for describing a relation between the synchronization signal generated by the adjusting circuit and timing constraints of the image sensor device according to the first embodiment.

FIG. 7 shows a case in which the transmission cycle phase of the synchronization signal 150 is delayed. The case shown in FIG. 7 occurs when the slave clock time jumps backward due to a correction since the slave clock time advances the master clock time. In the example shown in FIG. 7, the phase of a transmission cycle 700 changes after a pulse 702 and thus the interval between the pulse 702 and a pulse 706 is longer than the sum of the length of the unacceptable period and the maximum length of an acceptable period 746 (i.e., PB+PA). A pulse 704 shown by a dashed line shows the normal transmission timing which would arrive next to the pulse 702 according to the normal period P1 of the transmission cycle if the change in the phase of the transmission cycle did not occur.

A synchronization signal waveform 720 in FIG. 7 shows how the timing adjustment of the synchronization signal 150 is performed by the adjusting circuit 130. That is, the adjusting circuit 130 generates a synchronization signal pulse 722 according to the transmission timing 702 before the phase change. The position of the synchronization signal pulse 722 corresponds to an acceptable period 742 in a state 740 of the image sensor device 140. The image sensor device 140 starts an output of the pixel signal (762) in response to the reception of the synchronization signal pulse 722 and makes a transition to an unacceptable period 744 in which the charge accumulation in the image sensor 141 is executed.

Next, when the transmission timing does not arrive around the transmission timing 704 expected base on the last transmission timing 702, or in the acceptable period 746, the adjusting circuit 130 transmits a synchronization signal pulse 724 in a vicinity of the end of the acceptable period 746 determined based on the maximum length PA. The image sensor device 140 starts an output of the pixel signal (764) in response to the reception of the synchronization signal pulse 724 and makes a transition to an unacceptable period 748 in which the charge accumulation in the image sensor 141 is executed. The adjusting circuit 130 suppresses transmission of the synchronization signal pulse 726 according to the transmission timing 706 after the phase change. This is because the transmission timing 706 and the synchronization signal pulse 726 based on the transmission timing 706 are within the unacceptable period (748) in the state 740 of the image sensor device 140.

It should be noted with respect to FIG. 7 that the transmission timing of the synchronization signal pulse 724 lags behind the pulse 704 shown by the dashed line, which is the normal transmission timing which would arrive next to the pulse 702 according to the normal period P1 of the transmission cycle if the change in the phase of the transmission cycle did not occur. Therefore, by repeating the operation shown in FIG. 7 by step by step, the phase of the acceptable period after the acceptable period 746 gradually delays and, consequently, the phase of the acceptable period can be matched to the phase of the transmission cycle after the phase change.

As will be understood from the above description, the adjusting circuit 130 is configured to, when the transmission timing of the synchronization signal 150 determined according to the transmission cycle does not meet the timing constraints of the image sensor device 140, that is, when the transmission timing of the synchronization signal 150 is within the unacceptable period of the image sensor device 140, adjust the transmission timing of the synchronization signal 150 so that the synchronization signal 150 will be transmitted within the acceptable period of the image sensor device 140. In one example, the adjusting circuit 130 may be configured to suppress transmission of the synchronization signal 150 that does not meet the timing constraints of the image sensor device 140 and to transmit the synchronization signal 150 using the permissible range of the transmission timing within the timing constraints. By repeating this operation, the adjusting circuit 130 or the sensor controller 120 including the adjusting circuit 130 can gradually shift the phase of the acceptable period of the synchronization signal 150 conforming to the timing constraints so that the phase of the acceptable period approaches the phase of the transmission cycle after the phase change. Consequently, the image sensor device 140 can eventually follow the transmission cycle of the synchronization signal 150 after the phase change. The adjusting circuit 130 and the sensor controller 120 including the adjusting circuit 130 can thus follow the phase change of the transmission cycle of the synchronization signal 150 due to the correction or the like of the slave clock time, while avoiding degradation and lack of the image generated by the image sensor device 140 due to violation of the timing constraints of the image sensor device 140.

Second Embodiment

In this embodiment, a specific example of the configuration and the operation of the adjusting circuit 130 described in the first embodiment will be described. The configuration examples of the network system and the sensor controller according to this embodiment may be similar to those shown in FIGS. 1 and 2 described in the first embodiment.

Figure 8:
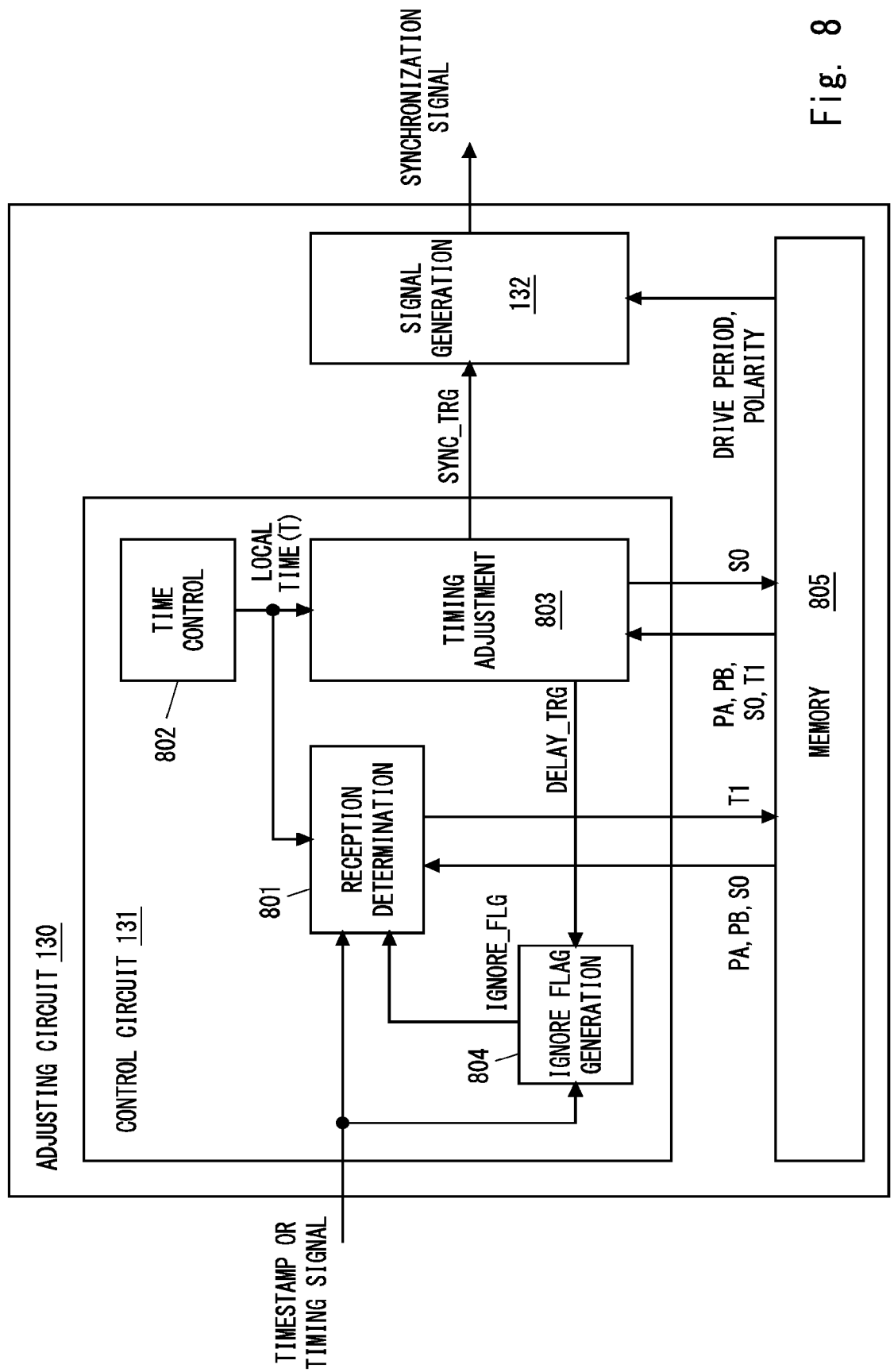
FIG. 8 is a Block diagram showing a configuration example of an adjusting circuit according to a second embodiment.

FIG. 8 is a Block diagram showing a configuration example of the adjusting circuit 130. In the example shown in FIG. 8, the adjusting circuit 130 includes a memory 805, in addition to the control circuit 131 and the signal generator 132. The memory 805 includes a volatile memory or a combination of a volatile memory and a non-volatile memory. The memory 805 stores configuration data used by the control circuit 131 and the signal generator 132 and also stores data generated by the control circuit 131.

More specifically, the memory 805 stores configuration information including the maximum value PA of the acceptable period of the image sensor device 140, the predetermined length PB of the unacceptable period of the image sensor device 140, and the drive period and the polarity of the synchronization signal 150. The memory 805 further stores an arrival time T1 of the transmission cycle based on the slave clock time and an immediately previous generation time S0 of the synchronization signal 150. The arrival time T1 and the generation time S0 are generated by the control circuit 131. The control circuit 131 measures the arrival time T1 and the generation time S0 based on the local time in the control circuit 131 generated by a time controller 802 that will be described later.

The control circuit 131 shown in FIG. 8 includes a reception determination unit 801, a time controller 802, a timing adjustment unit 803, and an ignore flag generation unit 804. In one implementation, the reception determination unit 801 receives from the TSU 125 the local timestamps indicating the absolute time (real time) synchronized with the master clock 20 and determines the arrival of the predetermined transmission cycle of the synchronization signal 150 based on the local timestamp. In another implementation, the reception determination unit 801 may receive a timing signal indicating the transmission cycle based on the slave clock time synchronized in time with the master clock time and determine the arrival of the transmission cycle of the synchronization signal 150 based on the timing signal. As one example, this timing signal may be a pulse signal such as transmission cycle waveforms (300, 400, 600 and 700) shown in FIGS. 3, 4, 6 and 7. In this case, the TSU 125 or a circuit coupled to the TSU 125 may generate the timing signal.

The reception determination unit 801 measures the arrival time T1 of the transmission cycle of the synchronization signal 150 based on the local time generated by the time controller 802 and stores the measured arrival time T1 in the memory 805. The operation of the reception determination unit 801 varies according to whether the arrival time T1 of the transmission cycle is within the acceptable period of the image sensor device 140.

The timing adjustment unit 803 and the ignore flag generation unit 804 collaborate with the reception determination unit 801 and execute the transmission timing adjustment of the synchronization signal 150 described in the first embodiment. The ignore flag generation unit 804 manages the state of an ignore flag (ignore_flg) indicating whether to ignore the arrival of the transmission cycle of the synchronization signal 150 in the reception determination unit 801.

Figure 9A:
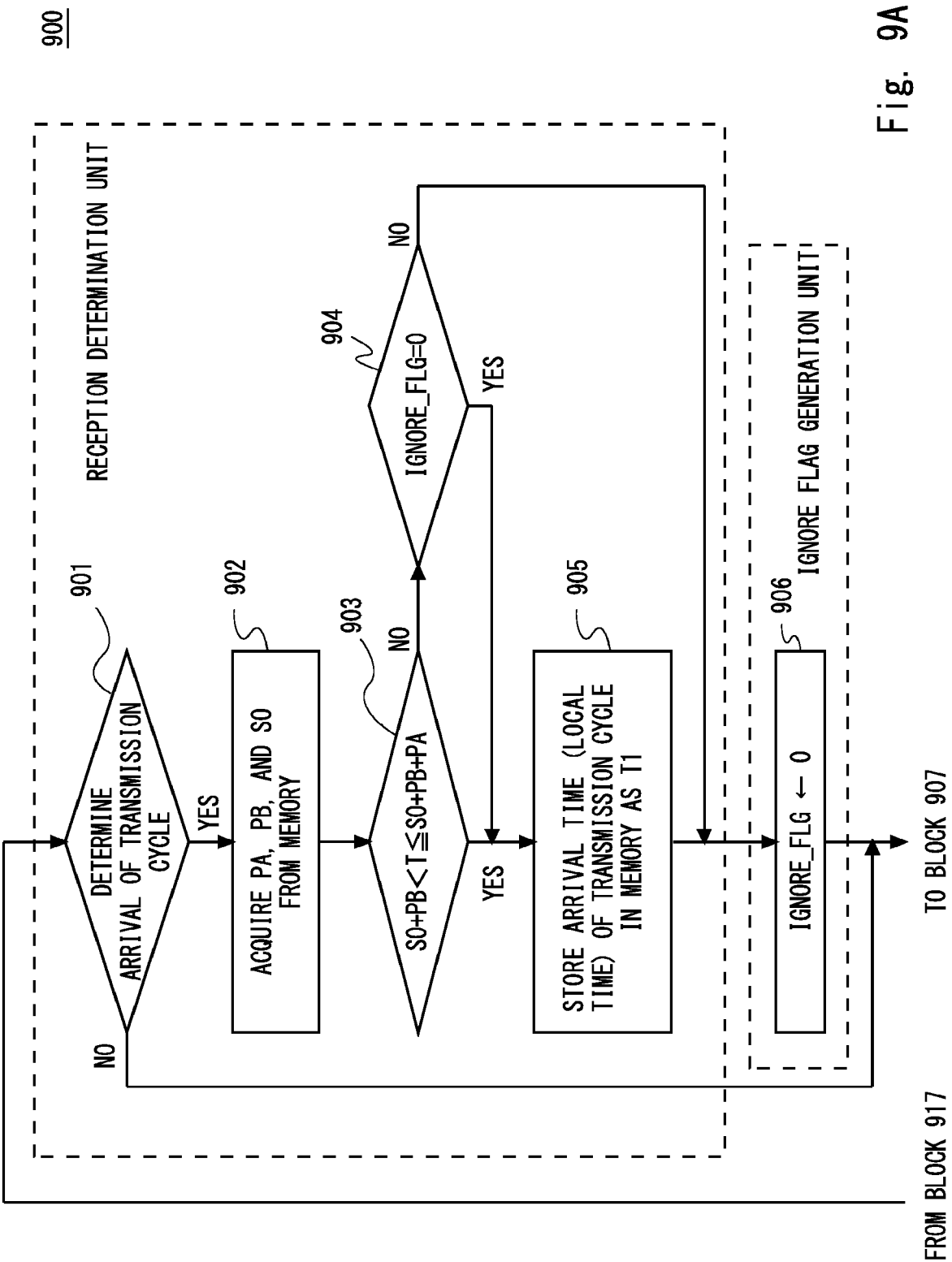
FIG. 9A is a flowchart showing one example of processing performed by the adjusting circuit according to the second embodiment.
Figure 9B:
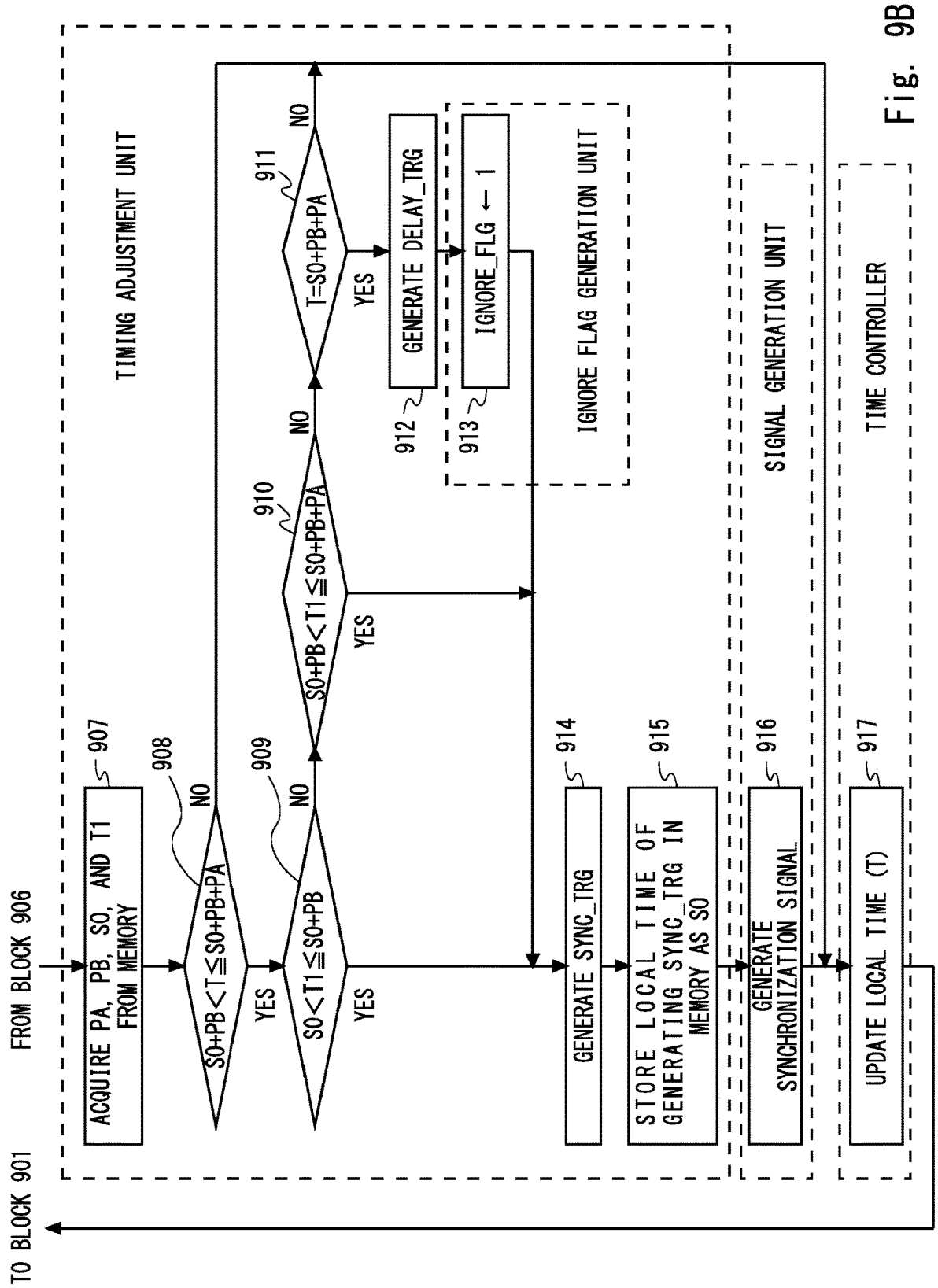
FIG. 9B is a flowchart showing one example of processing performed by the adjusting circuit according to the second embodiment.

FIGS. 9A and 9B are flowcharts showing processing 900 that is an example of processing performed by the adjusting circuit 130 shown in FIG. 8. Blocks 901 to 905 are executed by the reception determination unit 801. In Block 901, the reception determination unit 801 receives timestamp information indicating the slave clock synchronized in time with the master clock 20 or receives the timing signal based on the slave clock time, and determines the arrival of the transmission cycle of the synchronization signal 150. As described above, the timing signal may be a pulse signal indicating the transmission timing of the synchronization signal 150.

In response to the arrival of the transmission cycle of the synchronization signal 150 (YES in Block 901), processing of Blocks 902 to 906 are executed. Otherwise these processing are skipped. In Block 902, the reception determination unit 801 acquires, from the memory 805, the maximum length (PA) of the acceptable period of the image sensor device 140, the predetermined length (PB) of the unacceptable period of the image sensor device 140, and the immediately previous generation time (S0) of the synchronization signal 150. In Block 903, the reception determination unit 801 determines whether the current local time (T) supplied from the time controller 802 is within the acceptable period of the image sensor device 140 (i.e., S0+PB<T<=S0+PB+PA).

When the local time (T) is within the acceptable period (YES in Block 903), the reception determination unit 801 stores in the memory 805 the arrival time (T1) of the transmission cycle of the synchronization signal 150 based on the local time (T) (Block 905). On the other hand, when the local time (T) is outside the acceptable period (NO in Block 903), the reception determination unit 801 checks the state of the ignore flag (ignore_flg) (Block 904). When the value of the ignore flag is zero (YES in Block 904), the reception determination unit 801 stores in the memory 805 the arrival time (T1) of the transmission cycle of the synchronization signal 150 based on the local time (T) (Block 905). When the value of the ignore flag is 1 (NO in Block 904), the reception determination unit 801 does not store in the memory 805 the arrival time (T1) of the transmission cycle of the synchronization signal 150.

Block 906 is executed by the ignore flag generation unit 804. The ignore flag generation unit 804 sets (clears) the ignore flag to the value zero in Block 906.

Blocks 907 to 915 except for Block 913 are executed by the timing adjustment unit 803. Block 913 is executed by the ignore flag generation unit 804. In Block 907, the timing adjustment unit 803 acquires, from the memory 805, the maximum length (PA) of the acceptable period of the image sensor device 140, the predetermined length (PB) of the unacceptable period of the image sensor device 140, the immediately previous generation time (S0) of the synchronization signal 150, and the arrival time (T1) of the transmission cycle of the synchronization signal 150. In Block 908, the timing adjustment unit 803 determines whether the current local time (T) supplied from the time controller 802 is within the acceptable period of the image sensor device 140 (i.e., S0+PB<T<=S0+PB+PA). When the local time (T) is not in the acceptable period (NO in Block 908), the processing of Block 909 to 916 are skipped, the adjusting circuit 130 updates the local time (T) (Block 917), and the processing goes back to Block 901.

On the other hand, when the local time (T) is within the acceptable period (YES in Block 908), the timing adjustment unit 803 further checks the arrival time (T1) of the transmission cycle (Blocks 909 and 910). More specifically, when the arrival time (T1) of the transmission cycle is before the acceptable period of the image sensor device 140 (i.e., S0<T1<=S0+PB) (YES in Block 909), the timing adjustment unit 803 generates a trigger signal (sync_trg) to generate the synchronization signal 150 and supplies the trigger signal (sync_trg) to the signal generator 132 (Block 914). The timing adjustment unit 803 stores in the memory 805 the generation time (S0) of the trigger signal (sync_trg) based on the local time (T) (Block 915). This corresponds to the case in which the phase of the transmission cycle of the synchronization signal 150 is advanced, as described with reference to FIG. 6.

When the arrival time (T1) of the transmission cycle is within the acceptable period of the image sensor device 140 (i.e., S0+PB<T1<=S0+PB+PA) (YES in Block 910), the timing adjustment unit 803 supplies the trigger signal (sync_trg) to the signal generator 132 to generate the synchronization signal 150 (Block 914). The timing adjustment unit 803 stores in the memory 805 the generation time (S0) of the trigger signal (sync_trg) based on the local time (T) (Block 915). This corresponds to the case in which the phase of the transmission cycle of the synchronization signal 150 is normal, as described with reference to FIG. 3.

When neither the determination condition in Block 909 (i.e., S0<T1<=S0+PB) nor the determination condition in Block 910 (i.e., S0+PB<T1<=S0+PB+PA) is satisfied and the local time (T) has reached the end (maximum length PA) of the acceptable period of the image sensor device 140 (i.e., T=S0+PB+PA, YES in Block 911), the timing adjustment unit 803 generates a delay trigger signal (delay_trg) (Block 912) and also generates a trigger signal (sync_trg) to generate the synchronization signal 150 (Block 914). The timing adjustment unit 803 stores in the memory 805 the generation time (S0) of the trigger signal (sync_trg) based on the local time (T) (Block 915). This corresponds to the case in which the phase of the transmission cycle of the synchronization signal 150 is delayed, as described with reference to FIG. 7. The ignore flag generation unit 804 sets the ignore flag (ignore_flg) to the value 1 in response to receiving the delay trigger signal (delay_trg) (Block 913).

In Block 916, in response to receiving the trigger signal (sync_trg) from the timing adjustment unit 803, the signal generator 132 generates and supplies the synchronization signal 150 to the image sensor device 140. In Block 917, the time controller 802 updates the local time (T).

According to the configuration and the operation of the adjusting circuit 130 described in this embodiment, it is possible to obtain effects substantially the same as those in the adjusting circuit 130 described in the first embodiment.

Third Embodiment

In this embodiment, another specific example of the configuration and the operation of the adjusting circuit 130 described in the first embodiment will be described. The configuration examples of the network system and the sensor controller according to this embodiment may be similar to those shown in FIGS. 1 and 2.

In this embodiment, an improvement of the method for adjusting the transmission timing of the synchronization signal 150 is provided. In the method described in the first and second embodiments, when the transmission cycle phase of the synchronization signal 150 has been advanced, the adjusting circuit 130 repeats the operation of transmitting the synchronization signal 150 in the vicinity of the beginning of the acceptable period of the image sensor device 140, thereby gradually advancing the phase of the acceptable period and, consequently, the phase of the acceptable period is adjusted to the transmission cycle phase of the synchronization signal 150. This method may be not efficient, however, when the phase of the transmission cycle of the synchronization signal 150 has been greatly advanced. This is because the phase difference at most equal to the predetermined length (PB) of the unacceptable period has to be adjusted. Similarly, this method may be not efficient when the phase of the transmission cycle of the synchronization signal has been greatly delayed.

In order to address this problem, the method for adjusting the transmission timing of the synchronization signal 150 according to this embodiment is executed as follows. That is, when the phase of the transmission cycle of the synchronization signal 150 is greatly (e.g., a half or more of the length PB of the unacceptable period) advanced, the adjusting circuit 130 repeats the operation of transmitting the synchronization signal 150 in the vicinity of the end, determined based on the maximum length (PA), of the acceptable period of the image sensor device 140. That is, in contrast to the operations in the first and second embodiments, the phase of the acceptable period is gradually delayed and, consequently, the phase of the acceptable period is eventually adjusted to the transmission cycle phase of the synchronization signal 150.

Figure 10:
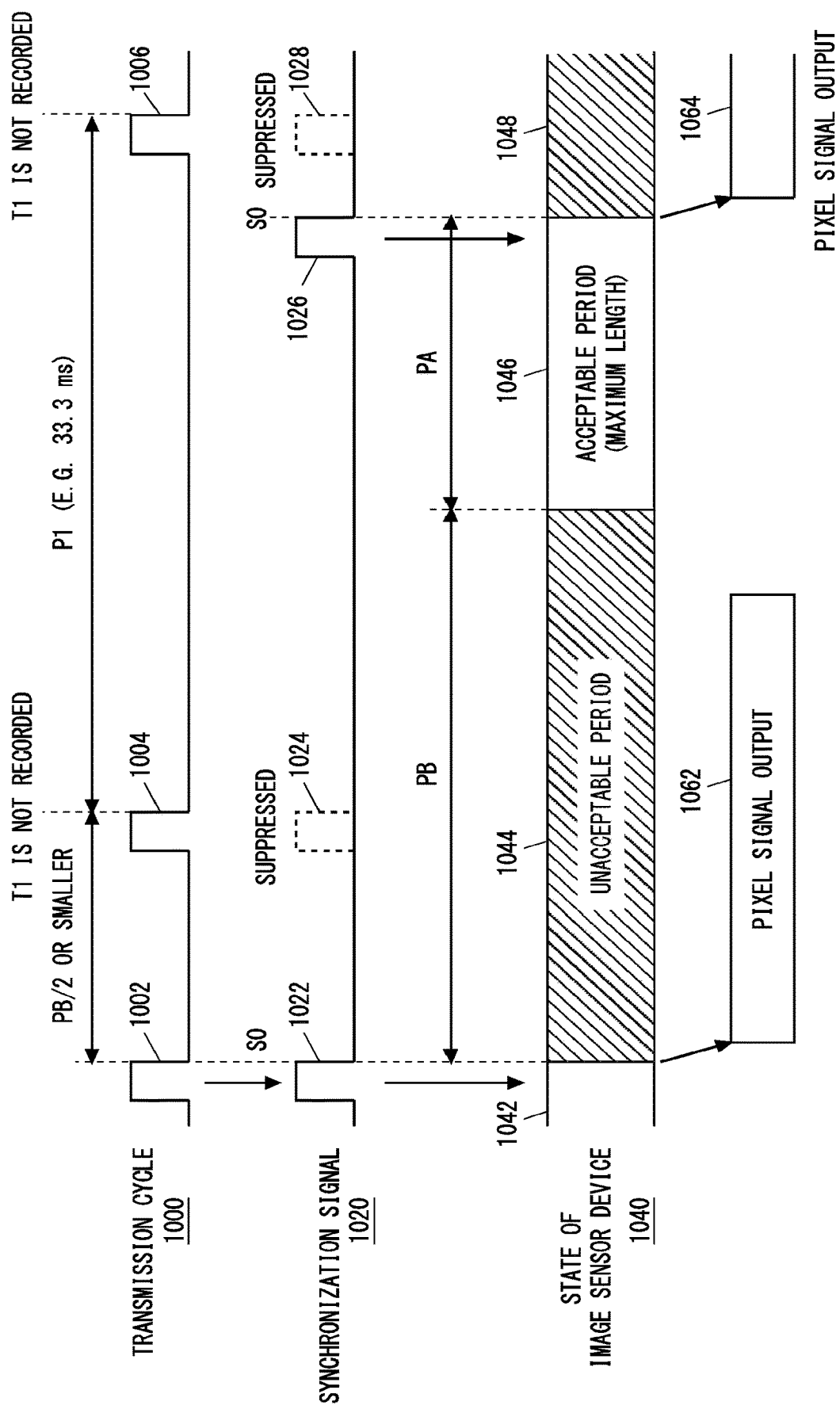
FIG. 10 is a diagram for describing a relation between a synchronization signal generated by an adjusting circuit and timing constraints of an image sensor device according to a third embodiment.

FIG. 10 is a diagram showing one example of the method for adjusting the transmission timing of the synchronization signal 150 according to this embodiment. FIG. 10 shows a case in which the transmission cycle phase of the synchronization signal 150 is advanced by a half or more of the length PB of the unacceptable period. In the example shown in FIG. 10, the phase of a transmission cycle 1000 changes after a pulse 1002 and thus the interval between the pulse 1002 and a pulse 1004 is a half or less of the length (PB) of the unacceptable period.

A synchronization signal waveform 1020 shown in FIG. 10 shows how the timing adjustment of the synchronization signal 150 is performed in the adjusting circuit 130. That is, the adjusting circuit 130 generates a synchronization signal pulse 1022 according to the transmission timing 1002 before the phase change. The position of the synchronization signal pulse 1022 corresponds to an acceptable period 1042 in a state 1040 of the image sensor device 140. The image sensor device 140 starts an output of the pixel signal (1062) in response to the reception of the synchronization signal pulse 1022 and makes a transition to an unacceptable period 1044 where the charge accumulation in the image sensor 141 is executed.

Next, the adjusting circuit 130 suppresses transmission of a synchronization signal pulse 1024 in response to the transmission timing 1004 after the phase change. This is because the transmission timing 1004 and the synchronization signal pulse 1024 based on the transmission timing 1004 are within an unacceptable period (1044) in the state 1040 of the image sensor device 140.

The above description regarding FIG. 10 is similar to the description regarding FIG. 6 according to the first embodiment. However, the following processing of the adjustment method shown in FIG. 10 is different from the adjustment method shown in FIG. 6. That is, the adjustment method shown in FIG. 6 described above includes promptly transmitting the synchronization signal pulse 626 in the vicinity of the beginning of the acceptable period 646, which follows the unacceptable period 644. Meanwhile, the adjustment method shown in FIG. 10 includes transmitting a synchronization signal pulse 1026 in the vicinity of the end, determined based on the maximum length PA, of an acceptable period 1046 following the unacceptable period 1044.

That is, in the method shown in FIG. 10, when the interval from the immediately previous transmission time (S0) of the synchronization signal to the arrival time of the next transmission cycle is shorter than a half of the length (PB) of the unacceptable period, the adjusting circuit 130 gradually delays the phase of the acceptable period instead of gradually advancing the phase of the acceptable period. Accordingly, the phase difference that should be adjusted by the adjusting circuit 130 is about a half of the length (PB) of the unacceptable period at most. Therefore, according to the method shown in FIG. 10, when the transmission cycle phase of the synchronization signal 150 has been greatly varied, the transmission cycle phase of the synchronization signal 150 can be matched to the phase of the acceptable period of the image sensor device 130 more promptly.

Figure 11:
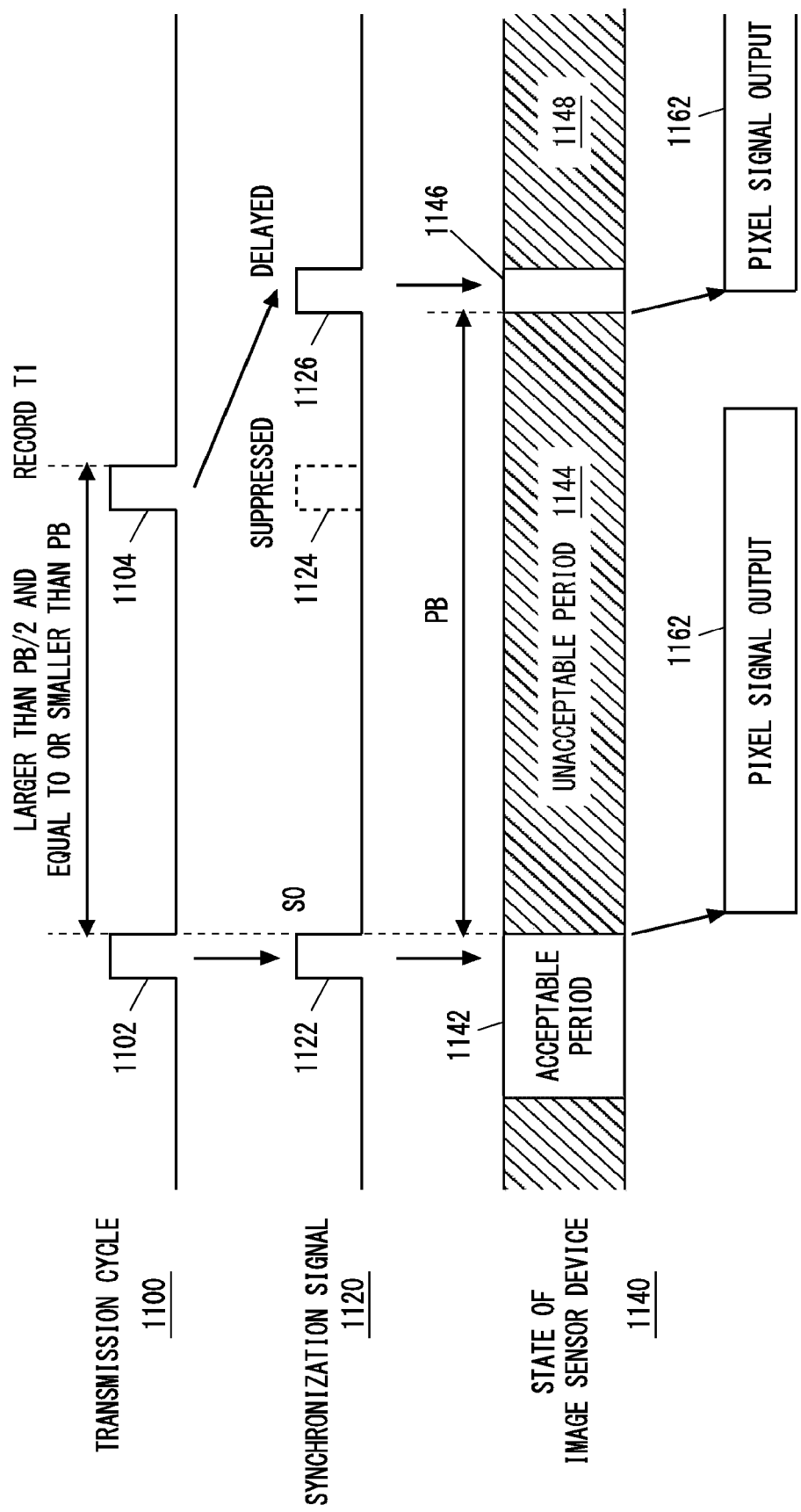
FIG. 11 is a diagram for describing a relation between the synchronization signal generated by the adjusting circuit and timing constraints of the image sensor device according to the third embodiment.

FIG. 11 is an example when the change of the transmission cycle phase of the synchronization signal 150 is small. More specifically, in the example shown in FIG. 11, the phase of a transmission cycle 1100 is changed after a pulse 1102 and the interval between the pulse 1102 and a pulse 1104 is larger than a half of the length (PB) of the unacceptable period but equal to or smaller than PB. Since the operation of the case shown in FIG. 11 is similar to that of FIG. 6, the detailed description will be omitted. That is, the transmission cycle 1100, the pulse 1102, and the pulse 1104 shown in FIG. 11 respectively correspond to the transmission cycle 600, the pulse 602, and the pulse 604 shown in FIG. 6. Further, a synchronization signal waveform 1120, a pulse 1122, a pulse 1124, and a pulse 1126 shown in FIG. 11 respectively correspond to the synchronization signal waveform 620, the pulse 622, the pulse 624, and the pulse 626 shown in FIG. 6. Further, a state 1140, an acceptable period 1142, an unacceptable period 1144, an acceptable period 1146, an unacceptable period 1148, a pixel signal output 1162, and a pixel signal output 1164 of the image sensor device shown in FIG. 11 respectively correspond to the state 640, the acceptable period 642, the unacceptable period 644, the acceptable period 646, the unacceptable period 648, the pixel signal output 662, and the pixel signal output 664 shown in FIG. 6.

Figure 12:
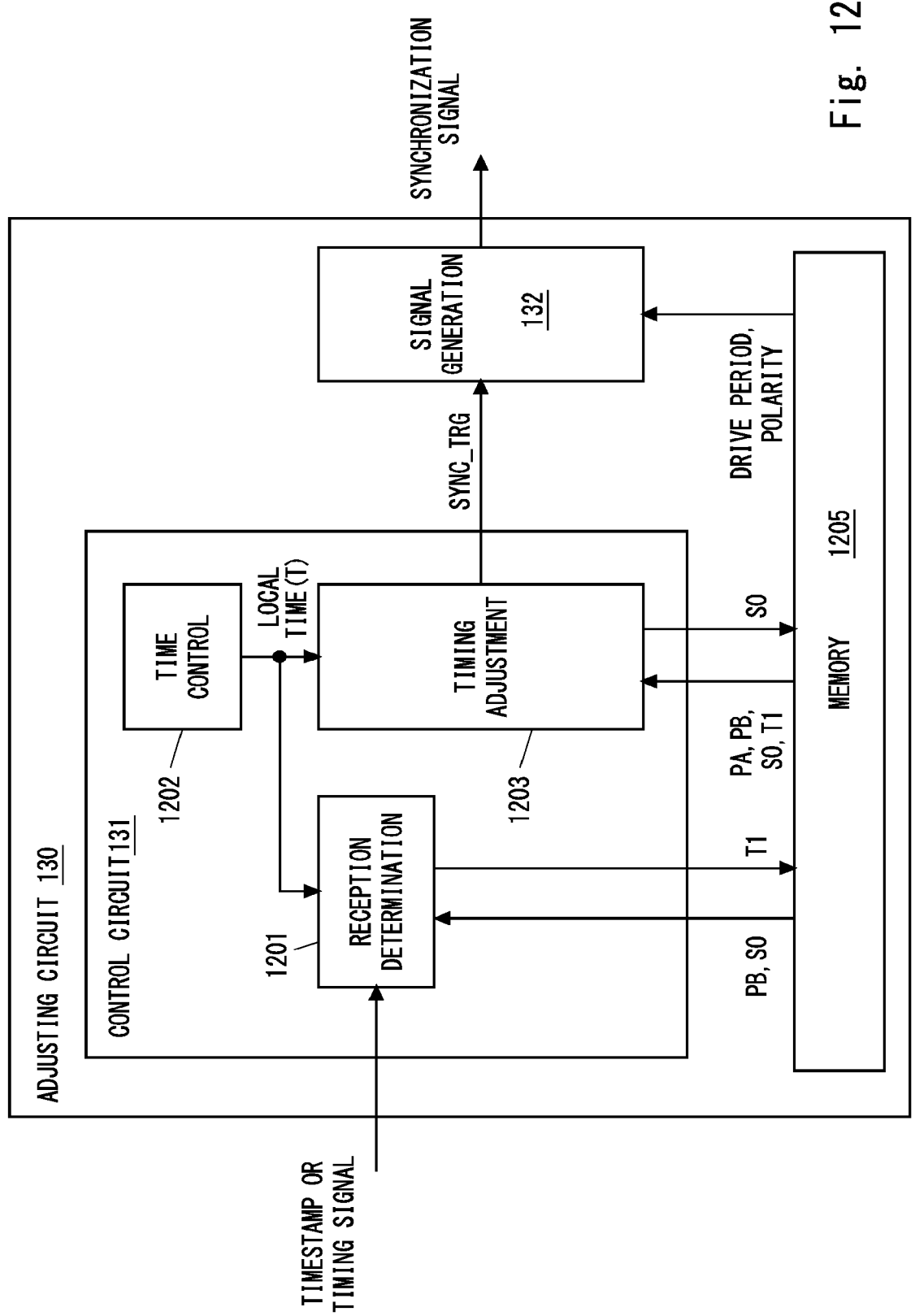
FIG. 12 is a Block diagram showing a configuration example of the adjusting circuit according to the third embodiment.

In the following description, a specific example of the configurations and the operations of the adjusting circuit 130 to execute the timing adjustment method of the synchronization signal 150 described in this embodiment will be described. FIG. 12 is a Block diagram showing a configuration example of the adjusting circuit 130. In the example shown in FIG. 12, the adjusting circuit 130 includes a memory 1205, in addition to the control circuit 131 and the signal generator 132. The control circuit 131 shown in FIG. 12 includes a reception determination unit 1201, a time controller 1202, and a timing adjustment unit 1203. As will be clear from the comparison between FIG. 8 and FIG. 12, the ignore flag generation unit 804 is omitted in the configuration example shown in FIG. 12. In order to execute the timing adjustment method of the synchronization signal 150 described in this embodiment, the operations of the reception determination unit 1201 and the timing adjustment unit 1203 are different from those of the reception determination unit 801 and the timing adjustment unit 803 shown in FIG. 8. The operation of the time controller 1202 may be similar to that of the time controller 802.

Figure 13A:
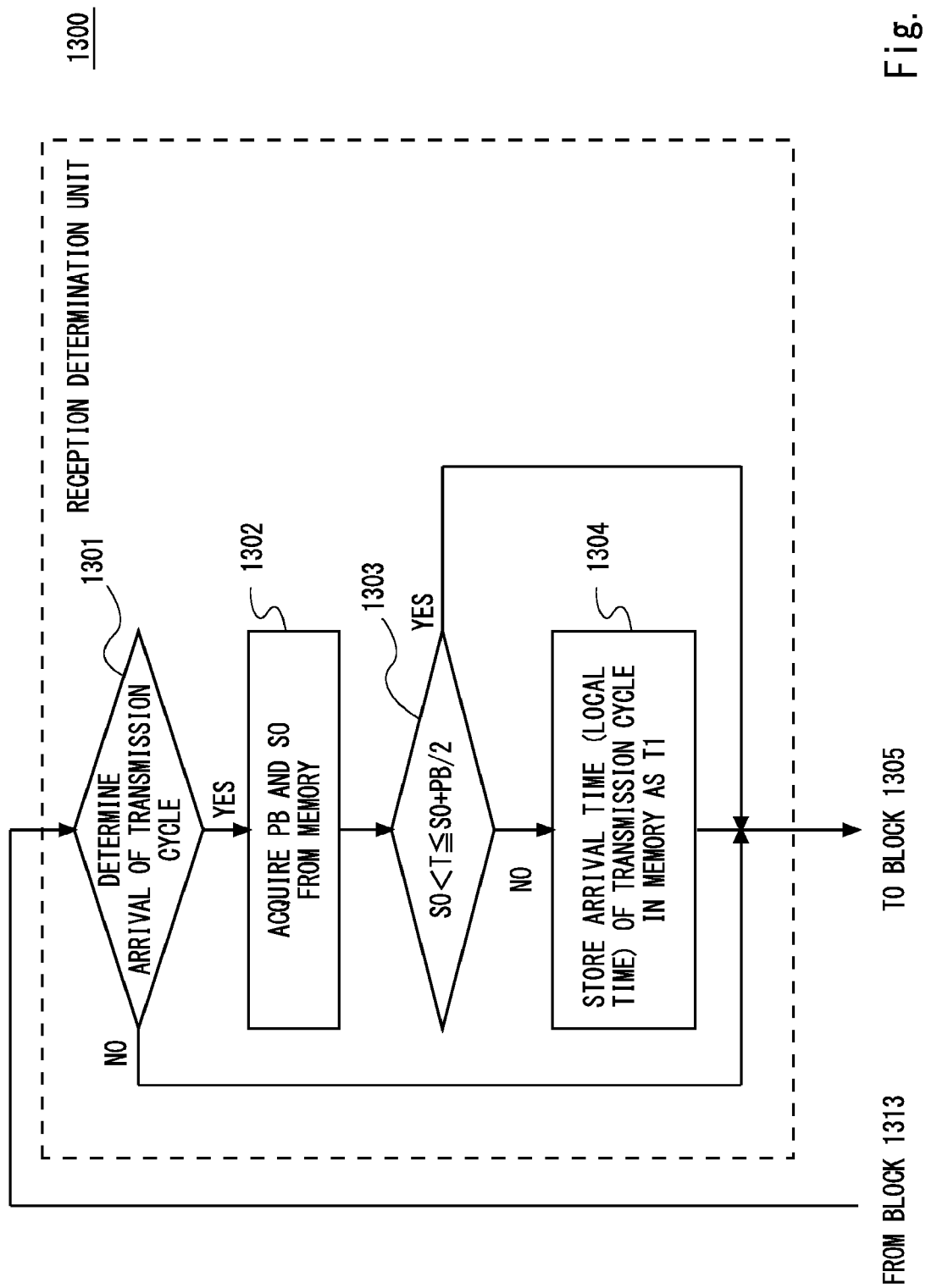
FIG. 13A is a flowchart showing one example of processing performed by the adjusting circuit according to the third embodiment.
Figure 13B:
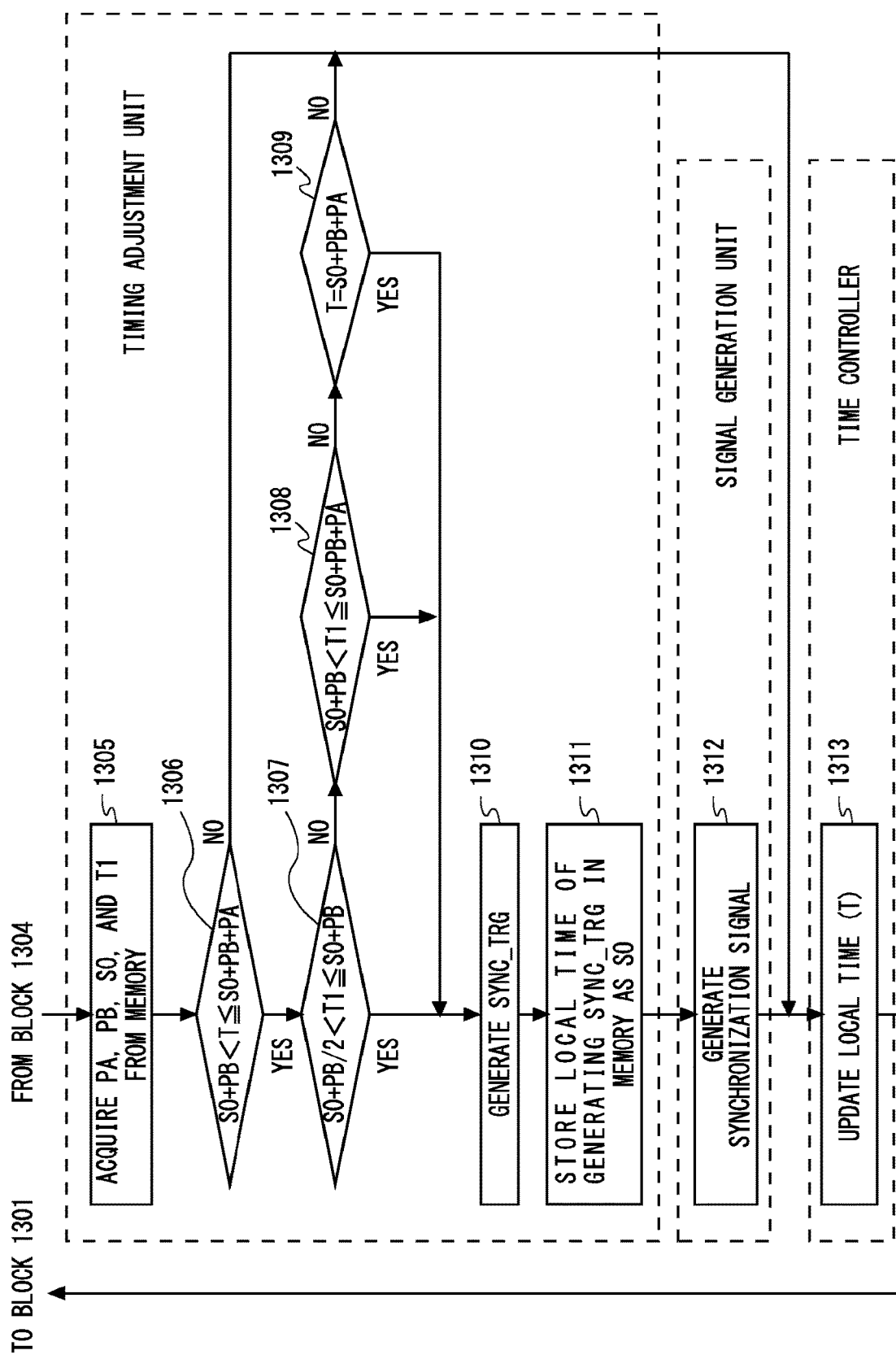
FIG. 13B is a flowchart showing one example of processing performed by the adjusting circuit according to the third embodiment.

FIGS. 13A and 13B are flowcharts showing processing 1300 that is one example of processing performed by the adjusting circuit 130 shown in FIG. 12. Blocks 1301 to 1304 are executed by the reception determination unit 1201. The processing of Block 1301 may be similar to the processing of Block 901 shown in FIG. 9A.

In response to the arrival of the transmission cycle of the synchronization signal 150 (YES in Block 1301), processing of Blocks 1302 to 1304 are executed. Otherwise, these processing are skipped. In Block 1302, the reception determination unit 1201 acquires, from the memory 1205, the predetermined length (PB) of the unacceptable period of the image sensor device 140 and the immediately previous generation time (S0) of the synchronization signal 150. In Block 1303, the reception determination unit 1201 determines whether the current local time (T) supplied from the time controller 1202 is within the former part of the unacceptable period of the image sensor device 140 (i.e., S0<T<=S0+PB/2).

When the local time (T) is not within the former part of the unacceptable period (NO in Block 1303), the reception determination unit 1201 stores in the memory 1205 the arrival time (T1) of the transmission cycle of the synchronization signal 150 based on the local time (T) (Block 1304). On the other hand, when the local time (T) is within the former part of the unacceptable period (YES in Block 1303), the reception determination unit 1201 does not store in the memory 1205 the arrival time (T1) of the transmission cycle of the synchronization signal 150.

Blocks 1305 to 1311 are executed by the timing adjustment unit 1203. The processing of Blocks 1305 and 1306 may be similar to the processing of Blocks 907 and 908 shown in FIG. 9B. When the local time (T) is not within the acceptable period (NO in Block 1306), the processing of Blocks 1307 to 1311 are skipped, the adjusting circuit 130 updates the local time (T) (Block 1313), and the processing goes back to Block 1301.

On the other hand, when the local time (T) is within the acceptable period (YES in Block 1306), the timing adjustment unit 1203 further checks the arrival time (T1) of the transmission cycle (Blocks 1307 and 1308). Specifically, when the arrival time (T1) of the transmission cycle is within the latter part (i.e., S0+PB/2<T1<=S0+PB) of the unacceptable period of the image sensor device 140 (YES in Block 1307), the timing adjustment unit 1203 generates the trigger signal (sync_trg) and supplies the trigger signal (sync_trg) to the signal generator 132 to generate the synchronization signal 150 (Block 1310). The timing adjustment unit 1203 stores in the memory 1205 the generation time (S0) of the trigger signal (sync_trg) based on the local time (T) (Block 1311). This corresponds to the case described with reference to FIG. 11.

When the arrival time (T1) of the transmission cycle is within the acceptable period of the image sensor device 140 (i.e., S0+PB<T1<=S0+PB+PA) (YES in Block 1308), the timing adjustment unit 1203 supplies the trigger signal (sync_trg) to the signal generator 132 to generate the synchronization signal 150 (Block 1310). The timing adjustment unit 1203 stores in the memory 1205 the generation time (S0) of the trigger signal (sync_trg) based on the local time (T) (Block 1311). This corresponds to the case in which the phase of the transmission cycle of the synchronization signal 150 is normal, as described with reference to FIG. 3.

When neither the determination condition in Block 1307 (i.e., S0+PB/2<T1<=S0+PB) nor the determination condition in Block 1308 (i.e., S0+PB<T1<=S0+PB+PA) is satisfied and the local time (T) has reached the end (maximum length PA) of the acceptable period of the image sensor device 140 (i.e., T=S0+PB+PA, YES in Block 1309), the timing adjustment unit 1203 supplies the trigger signal (sync_trg) to the signal generator 132 to generate the synchronization signal 150 (Block 1310). The timing adjustment unit 1203 stores in the memory 1205 the generation time (S0) of the trigger signal (sync_trg) based on the local time (T) (Block 1311). This corresponds to the case in which the phase of the transmission cycle of the synchronization signal 150 is delayed, as described with reference to FIG. 7, and the case in which the transmission cycle phase has been greatly advanced, as described with reference to FIG. 10.

The processing of Blocks 1312 and 1313 may be similar to the processing of Blocks 916 and 917 shown in FIG. 9B.

Fourth Embodiment

In this embodiment, modification of the configuration and the operation of the adjusting circuit 130 described in the third embodiment will be described. The configuration examples of the network system and the sensor controller according to this embodiment may be similar to those shown in FIGS. 1 and 2 described in the first embodiment.

Figure 14:
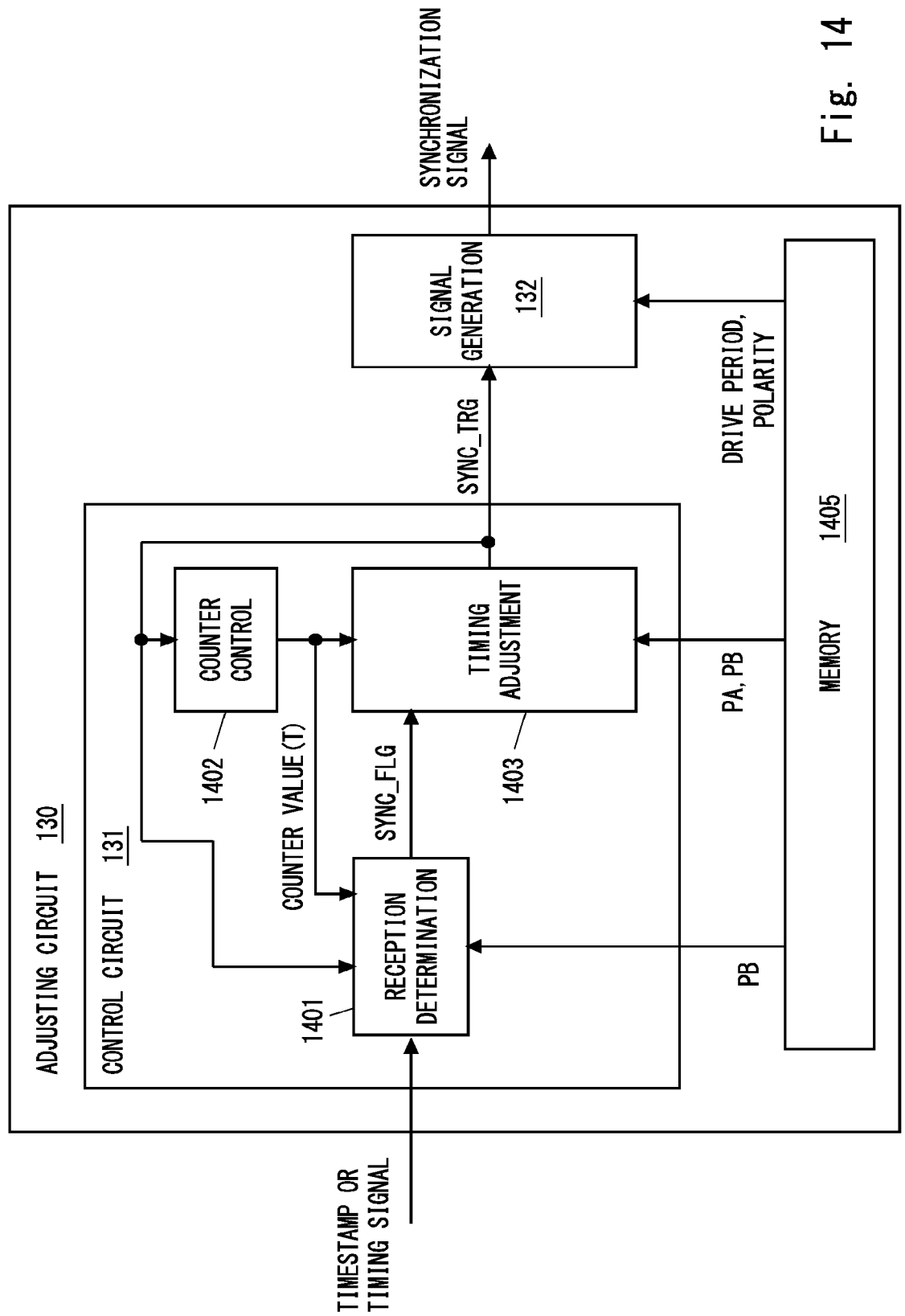
FIG. 14 is a Block diagram showing a configuration example of an adjusting circuit according to a fourth embodiment.

FIG. 14 is a Block diagram showing a configuration example of the adjusting circuit 130. In the example shown in FIG. 14, the adjusting circuit 130 includes a memory 1405, in addition to the control circuit 131 and the signal generator 132. The control circuit 131 shown in FIG. 14 includes a reception determination unit 1401, a counter controller 1402, and a timing adjustment unit 1403. As will be clear from the comparison between FIG. 12 and FIG. 14, in the configuration example shown in FIG. 14, the time controller 1202 is replaced by the counter controller 1402. In accordance therewith, the timing adjustment unit 1403 needs not store the generation time (S0) of the synchronization signal 150 in the memory 1405. Further, the reception determination unit 1401 supplies the synchronization flag (sync_flg) indicating the arrival of the transmission cycle to the timing adjustment unit 1403, thereby eliminating the need to store the arrival time (T1) of the transmission cycle of the synchronization signal 150 in the memory 1405.

According to the configuration example shown in FIG. 14, there is no need to store the immediately previous generation time (S0) of the synchronization signal 150 and the arrival time (T1) of the transmission cycle in the memory 1405. Accordingly, the size of the circuit can be reduced compared to that in the configuration example shown in FIG. 12 described in the third embodiment.

Figure 15A:
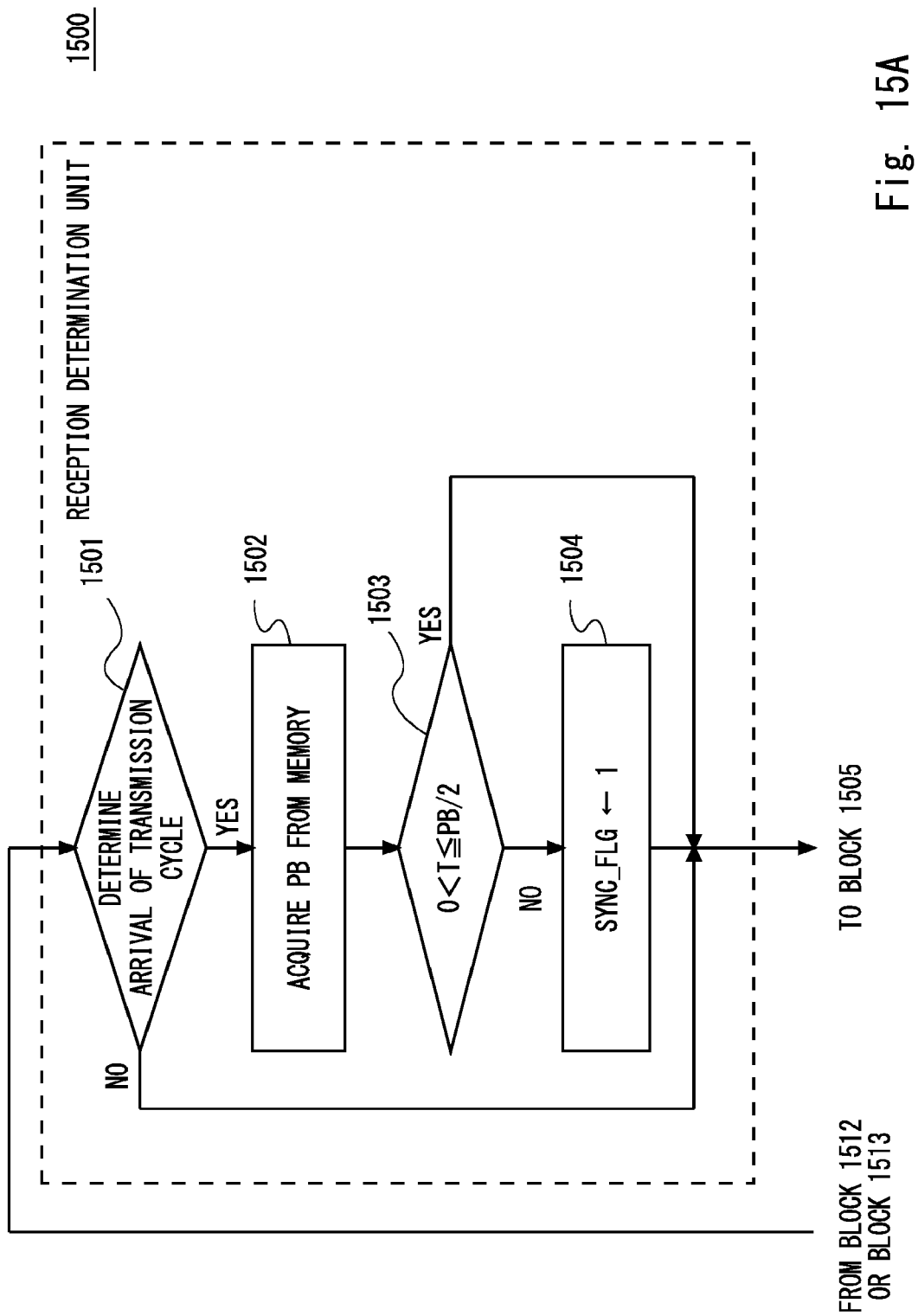
FIG. 15A is a flowchart showing one example of processing performed by the adjusting circuit according to the fourth embodiment.
Figure 15B:
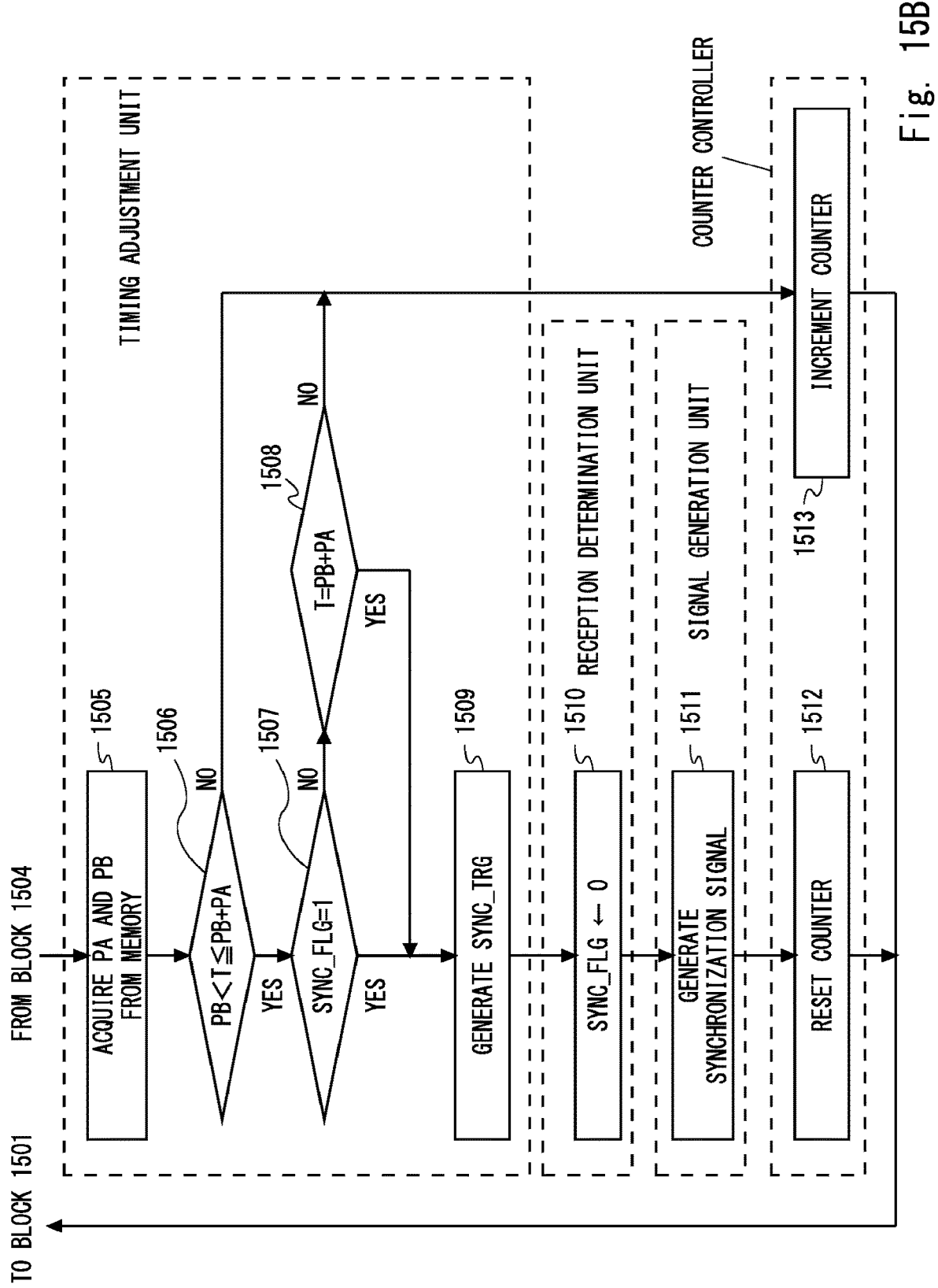
FIG. 15B is a flowchart showing one example of processing performed by the adjusting circuit according to the fourth embodiment.

FIGS. 15A and 15B show a flowchart showing processing 1500 that is one example of processing performed by the adjusting circuit 130 shown in FIG. 14. The processing of Block 1501 may be similar to the processing of Block 901 shown in FIG. 9A or the processing of Block 1301 shown in FIG. 13A.

The processing of Blocks 1502 to 1504 is substantially the same as the processing of Blocks 1302 to 1304 except for some changes therein due to the employment of the counter controller 1402. That is, in response to the arrival of the transmission cycle of the synchronization signal 150 (YES in Block 1501), the processing of Blocks 1502 to 1504 are executed, and otherwise this processing is skipped. In the Block 1502, the reception determination unit 1401 acquires the predetermined length (PB) of the unacceptable period of the image sensor device 140 from the memory 1405. In Block 1503, the reception determination unit 1401 determines whether the counter value (T) corresponding to the current local time supplied from the counter controller 1402 is within the former part of the unacceptable period of the image sensor device 140 (i.e., $0<T<=PB/2$).

When the counter value (T) is not within the former part of the unacceptable period (NO in Block 1503), the reception determination unit 1401 sets the synchronization flag (sync_flg) to the value 1 to notify the timing adjustment unit 1403 of the arrival of the transmission cycle of the synchronization signal 150 (Block 1504). On the other hand, when the counter value (T) is within the former part of the unacceptable period (YES in Block 1503), the reception determination unit 1401 does not set the synchronization flag (sync_flg).

Blocks 1505 to 1509 are executed by the timing adjustment unit 1403. In Block 1505, the timing adjustment unit 1403 acquires, from the memory 1405, the predetermined length (PB) of the unacceptable period and the maximum length (PA) of the acceptable period of the image sensor device 140. In Block 1506, the timing adjustment unit 1403 determines whether the current counter value (T) supplied from the counter controller 1402 is within the acceptable period of the image sensor device 140 (i.e., $PB<T<=PB+PA$). When the counter value (T) is not within the acceptable period (NO in Block 1506), the processing of Blocks 1507 to 1511 are skipped, the adjusting circuit 130 updates the counter value (T) (i.e., local time) by incrementing the counter in the counter controller 1402 (Block 1513), and the processing goes back to Block 1501.

On the other hand, when the counter value (T) is within the acceptable period (YES in Block 1506), the timing adjustment unit 1403 further checks the value of the synchronization flag (sync_flg). Specifically, when the value of the synchronization flag (sync_flg) is 1 (YES in Block 1507), the timing adjustment unit 1403 generates a trigger signal (sync_trg) and supplies the trigger signal (sync_trg) to the signal generator 132 to generate the synchronization signal 150 (Block 1509). That the value of the synchronization flag (sync_flg) is 1 corresponds to the case in which the arrival time (T1) of the transmission cycle is within the latter part of the unacceptable period of the image sensor device 140 (i.e., $S0+PB/2<T1<=S0+PB$) or the case in which the arrival time (T1) of the transmission cycle is within the acceptable period (i.e., $S0+PB<T1<=S0+PB+PA$). Therefore, this corresponds to the case described with reference to FIG. 11 or the case described with reference to FIG. 3.

When the value of the synchronization flag (sync_flg) is 0 (NO in Block 1507) and the counter value (T) has reached the end (maximum length PA) of the acceptable period of the image sensor device 140 (i.e., $T=PB+PA$, YES in Block 1508), the timing adjustment unit 1403 supplies the trigger signal (sync_trg) to the signal generator 132 to generate the synchronization signal 150 (Block 1509). This corresponds to the case in which the phase of the transmission cycle of the synchronization signal 150 has been delayed, as described with reference to FIG. 7, and the transmission cycle phase has been greatly advanced, as described with reference to FIG. 10.

The synchronization flag (sync_flg) is set (cleared) to the value zero after the trigger signal (sync_trg) has been generated. The processing of Block 1511 may be similar to the processing of Block 916 shown in FIG. 9B or the processing of Block 1312 shown in FIG. 13B. In Block 1512, upon generating the synchronization signal 1511, the counter controller 1402 sets (resets) the counter that measures the local time to the value zero.

In the configurations and the operations described with reference to FIGS. 14, 15A and 15B, the counter controller 1402 operates to count from 0 to PB+PA. In one implementation, a state signal that indicates the acceptable period and the unacceptable period of the image sensor device 140 may be newly provided and the counter controller 1402 may count the acceptable period from 0 to PA and the unacceptable period from 0 to PB. In this case, in Block 1503 shown in FIG. 15A, besides determining whether the counter value (T) is $0<T<=PB/2$, the reception determination unit 1401 may further determine whether the state signal indicates the unacceptable period. On the other hand, in Block 1506 in FIG. 15B, the timing adjustment unit 1403 may only determine whether the state signal indicates the acceptable period. Further, in Block 1508 in FIG. 15B, the timing adjustment unit 1403 may determine whether the counter value (T) is PA (T=PA) and the state signal indicates the acceptable period. It is therefore possible to eliminate an adder (PB+PA) to calculate the sum of PB and PA in the timing adjustment unit 1403.

Other Embodiments

The processing of the control circuit 131 described in the above embodiments may be achieved by causing a computer system including at least one processor to execute a program. More specifically, one or more programs including instructions to cause a computer system to execute the algorithm described in the specification using the drawings including the flowcharts may be created and this program(s) may be supplied to the computer system. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

In the above embodiments, cases in which the device to be controlled is an image sensor device have been mainly described. However, the technical idea described in the above embodiments may be widely used to control a device to be controlled having timing constraints other than the image sensor device.

The above-described embodiments can be combined as appropriate or desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
an image sensor device controlled by an adjusting circuit; and
the adjusting circuit configured to transmit a control signal to the image sensor device to be controlled according to a transmission cycle synchronized with a reference clock, wherein
the image sensor device includes a first period during which the control signal is allowed to be supplied to the image sensor device to be controlled and a second period during which the supplying of the control signal to the image sensor device to be controlled is not preferable compared to that in the first period,
the adjusting circuit is configured to, when a transmission timing of the control signal determined according to the transmission cycle is within the second period, adjust the transmission timing of the control signal so that the control signal will be transmitted in the first period to the image sensor device, and
the adjusting circuit is further configured to receive a local timestamp indicating the reference clock and to determine the transmission cycle based on the local timestamp.

2. The semiconductor device according to claim 1, wherein
the first period and the second period are alternately repeated in the image sensor device,
the first period is a non-fixed period that ends upon receiving the control signal,
the second period is a fixed period having a predetermined length,
the predetermined length of the second period is less than the period of the transmission cycle by a first length,
a maximum length of the first period is equal to or greater than the first length and less than the predetermined length of the second period, and
while the transmission timing of the control signal determined according to the transmission cycle is not within the first period, the adjusting circuit repeatedly suppresses transmission of the control signal not within the first period and also repeatedly transmits the control signal in a vicinity of a beginning of the first period or in a vicinity of an end of the first period based on the maximum length thereof, thereby gradually shifting a phase of the first period so that the phase of the first period approaches a phase of the transmission cycle.

3. The semiconductor device according to claim 2, wherein when the transmission timing of the control signal determined according to the transmission cycle arrives before the first period, the adjusting circuit suppresses transmission of the control signal not within the first period and transmits the control signal in the vicinity of the beginning of the first period.

4. The semiconductor device according to claim 2, wherein when the transmission timing of the control signal determined according to the transmission cycle arrives after the first period, the adjusting circuit transmits the control signal in the vicinity of the end of the first period based on the maximum length thereof and suppresses transmission of the control signal outside the first period.

5. The semiconductor device according to claim 2, wherein
the vicinity of the beginning of the first period is defined so that a time from a beginning of the second period, which is immediately preceding the first period, to the vicinity of the beginning of the first period becomes less the period of the transmission cycle, and
the vicinity of the end of the first period is defined so that a time from the beginning of the second period, which is immediately preceding the first period, to the vicinity of the end of the first period becomes greater than the period of the transmission cycle.

6. The semiconductor device according to claim 1, wherein while the transmission timing of the control signal determined according to the transmission cycle is not within a first period, the adjusting circuit repeatedly suppresses transmission of the control signal not within the first period and also repeatedly transmits the control signal in a vicinity of a beginning of the first period or in a vicinity of an end of the first period based on a maximum length thereof, thereby gradually shifting a phase of the first period such that the phase of the first period approaches a phase of the transmission cycle.

7. A semiconductor device comprising:
an image sensor device; and
an adjusting circuit controlling the image sensor device, wherein
the image sensor device includes a first period during which the control signal is allowed to be supplied to the image sensor device to be controlled and a second period during which the supplying of the control signal to the image sensor device to be controlled is not preferable compared to that in the first period,
the adjusting circuit is configured to transmit a control signal to the image sensor device to be controlled according to a transmission cycle synchronized with a reference clock, and
the adjusting circuit is configured to, when a transmission timing of the control signal determined according to the transmission cycle is within the second period, adjust the transmission timing of the control signal such that the control signal will be transmitted in the first period to the image sensor device.

8. The semiconductor device according to claim 7, wherein the adjusting circuit is further configured to receive a local timestamp indicating the reference clock and to determine the transmission cycle based on the local timestamp.

9. The semiconductor device according to claim 7, wherein the image sensor device includes the first period during which the control signal is allowed to be supplied to the image sensor device to be controlled and the second period.

10. The semiconductor device according to claim 7, wherein
the first period and the second period are alternately repeated in the image sensor device,
the first period is a non-fixed period that ends upon receiving the control signal,
the second period is a fixed period having a predetermined length,
the predetermined length of the second period is less than the period of the transmission cycle by a first length, and
a maximum length of the first period is equal to or greater than the first length and less than the predetermined length of the second period.

11. The semiconductor device according to claim 7, wherein while the transmission timing of the control signal determined according to the transmission cycle is not within the first period, the adjusting circuit repeatedly suppresses transmission of the control signal not within the first period and also repeatedly transmits the control signal in a vicinity of a beginning of the first period or in a vicinity of an end of the first period based on a maximum length thereof, thereby gradually shifting a phase of the first period so that the phase of the first period approaches a phase of the transmission cycle.

12. The semiconductor device according to claim 11, wherein when the transmission timing of the control signal determined according to the transmission cycle arrives before the first period, the adjusting circuit suppresses transmission of the control signal not within the first period and transmits the control signal in the vicinity of the beginning of the first period.

13. The semiconductor device according to claim 11, wherein when the transmission timing of the control signal determined according to the transmission cycle arrives after the first period, the adjusting circuit transmits the control signal in the vicinity of the end of the first period based on the maximum length thereof and suppresses transmission of the control signal outside the first period.

14. The semiconductor device according to claim 11, wherein
the vicinity of the beginning of the first period is defined so that a time from a beginning of the second period, which is immediately preceding the first period, to the vicinity of the beginning of the first period becomes less the period of the transmission cycle, and
the vicinity of the end of the first period is defined so that a time from the beginning of the second period, which is immediately preceding the first period, to the vicinity of the end of the first period becomes greater than the period of the transmission cycle.

15. An adjusting circuit, comprising:
a control circuit determines a transmission cycle of a synchronization signal; and
a signal generator generates the synchronization signal according to a timing indicated by the control circuit and supplies the synchronization signal to an image sensor device to be controlled, wherein
the control circuit and the signal generator are configured to transmit the synchronization signal to the image sensor device to be controlled according to the transmission cycle that is synchronized with a reference clock, and
the control circuit is configured to, when a transmission timing of the synchronization signal determined according to the transmission cycle is within a second period, adjust the transmission timing of the synchronization signal such that the synchronization signal will be transmitted in a first period to the image sensor device.

16. The adjusting circuit according to claim 15, wherein the control circuit is further configured to receive a local timestamp indicating the reference clock and to determine the transmission cycle based on the local timestamp.

17. The adjusting circuit according to claim 15, wherein
the first period and the second period are alternately repeated in the image sensor device,
the first period is a non-fixed period that ends upon receiving a control signal,
the second period is a fixed period having a predetermined length,
the predetermined length of the second period is less than the period of the transmission cycle by a first length,
a maximum length of the first period is equal to or greater than the first length and less than the predetermined length of the second period, and
while the transmission timing of the control signal determined according to the transmission cycle is not within the first period, the adjusting circuit repeatedly suppresses transmission of the control signal not within the first period and also repeatedly transmits the control signal in a vicinity of a beginning of the first period or in a vicinity of an end of the first period based on the maximum length thereof, thereby gradually shifting a phase of the first period so that the phase of the first period approaches a phase of the transmission cycle.

18. The adjusting circuit according to claim 17, wherein when the transmission timing of the control signal determined according to the transmission cycle arrives before the first period, the adjusting circuit suppresses transmission of the control signal not within the first period and transmits the control signal in the vicinity of the beginning of the first period.

19. The adjusting circuit according to claim 17, wherein when the transmission timing of the control signal determined according to the transmission cycle arrives after the first period, the adjusting circuit transmits the control signal in the vicinity of the end of the first period based on the maximum length thereof and suppresses transmission of the control signal outside the first period.

20. The adjusting circuit according to claim 17, wherein
the vicinity of the beginning of the first period is defined so that a time from a beginning of the second period, which is immediately preceding the first period, to the vicinity of the beginning of the first period becomes less the period of the transmission cycle, and
the vicinity of the end of the first period is defined so that a time from the beginning of the second period, which is immediately preceding the first period, to the vicinity of the end of the first period becomes greater than the period of the transmission cycle.

* * * * *